US006166747A

United States Patent [19]

Mizutani

[11] Patent Number: 6,166,747

[45] Date of Patent: Dec. 26, 2000

[54] GRAPHICS PROCESSING METHOD AND APPARATUS THEREOF

[75] Inventor: Kenichi Mizutani, Kanagawa, Japan

[73] Assignee: NEC Corporation, Tokyo, Japan

[21] Appl. No.: 09/146,532

[22] Filed: Sep. 3, 1998

[30] Foreign Application Priority Data

Sep. 3, 1997 [JP] Japan .................................... 9-238625

[51] Int. Cl.$^{7}$ ........................................................ G06T 1/60

[52] U.S. Cl. ........................... 345/507; 345/524; 345/501

[58] Field of Search ..................................... 345/507–509, 345/513, 515, 516, 523–525, 501

[56] References Cited

U.S. PATENT DOCUMENTS

| | | | |
|---|---|---|---|
| 4,486,745 | 12/1984 | Konno | 345/194 |
| 4,788,636 | 11/1988 | Shiratori et al. | 345/507 |
| 4,845,656 | 7/1989 | Nishibe et al. | 345/525 |
| 5,583,985 | 12/1996 | Kohiyama et al. | 345/507 |

FOREIGN PATENT DOCUMENTS

| | | | |
|---|---|---|---|
| 0 663 659 | 7/1995 | European Pat. Off. | G09G 1/16 |
| 2 576 124 | 7/1986 | France | G06F 15/62 |
| 2-265375 | 10/1990 | Japan | G06F 15/40 |
| 3-73999 | 3/1991 | Japan | G09G 5/36 |
| 5-128832 | 5/1993 | Japan | G09G 5/00 |
| 6-266347 | 9/1994 | Japan | G09G 5/36 |
| 8-16980 | 1/1996 | Japan | G08G 1/07 |
| 91/06924 | 5/1991 | WIPO | G06K 15/02 |

*Primary Examiner*—Kee M. Tung
*Attorney, Agent, or Firm*—Sughrue, Mion, Zinn, Macpeak & Seas, PLLC

[57] ABSTRACT

The graphics apparatus of the present invention is comprised of: registers, in which the address of a primitive graphic form stored in a graphic ROM unit and the number of dynamic images for the primitive graphic form are both stored, and an updating register, in which the difference value or the logically calculated value between the address of the primitive graphic form stored in the graphic ROM unit and the address of the dynamic graphic forms stored in a graphic ROM unit for dynamic graphic forms, is stored. Addresses necessary to display dynamic frames in the graphic ROM unit are calculated based upon the previously mentioned values and addresses.

13 Claims, 21 Drawing Sheets

| FRAME NO | SC1 | SC2 | SC3 | | SC4 | | SC5 | | SC6 | | SC7 |
|---|---|---|---|---|---|---|---|---|---|---|---|
| FIFO | NO SET | a | a | b | a | b | a | b | a | b | b |
| P1 | | 10 | 20 | 110 | 30 | 120 | 40 | 130 | 10 | 140 | 110 |
| P2 | | y1 | (y1) | (y2) | (y1) | (y2) | (y1) | (y2) | (y1) | (y2) | (y2) |
| P3 | | x1 | (x1) | (x2) | (x1) | (x2) | (x1) | (x2) | (x1) | (x2) | (x2) |
| ROM ADDRESS S16 | | 10 | 20 | 110 | 30 | 120 | 40 | 130 | 10 | 140 | 110 |
| GRAPHIC FORM | | α1 | α2 | β1 | α3 | β2 | α4 | β3 | α1 | β4 | β1 |

| FRAME NO | SC1 | SC2 | SC3 | | SC4 | | SC5 | | SC6 | | SC7 |
|---|---|---|---|---|---|---|---|---|---|---|---|
| FIFO | NO SET | a | a | b | a | b | a | b | a | b | b |
| P1 | | 10 | (10) | (110) | (10) | (110) | (10) | (110) | (10) | (110) | (110) |
| P2 | | y1 | (y1) | (y2) | (y1) | (y2) | (y1) | (y2) | (y1) | (y2) | (y2) |
| P3 | | x1 | (x1) | (x2) | (x1) | (x2) | (x1) | (x2) | (x1) | (x2) | (x2) |
| P4 | | 0 | 3 | 0 | 2 | 3 | 1 | 2 | 0 | 1 | 0 |
| P5 | | 0 | 10 | 0 | 20 | 10 | 30 | 20 | 0 | 30 | 0 |
| P6 | | FFF | F0F | FFF | F0F | F0F | F0F | F0F | FFF | F0F | FFF |
| P7 | | 0 | 20 | 0 | 30 | 20 | 40 | 30 | 0 | 40 | 0 |
| ROM ADDRESS S19 | | 10 | 20 | 110 | 30 | 120 | 40 | 130 | 10 | 140 | 110 |
| GRAPHIC FORM | | α1 | α2 | β1 | α3 | β2 | α4 | β3 | α1 | β4 | β1 |

| | P5 | P6 | P7 |
|---|---|---|---|
| 0 | OFF | | |
| 1 | 30 | F0F | 40 |
| 2 | 20 | F0F | 30 |
| 3 | 10 | F0F | 20 |

CONTAINED IN UPDATING REGISTER

| FRAME NO | SC1 | SC2 | SC3 | | SC4 | | SC5 | | SC6 | | SC7 |
|---|---|---|---|---|---|---|---|---|---|---|---|
| FIFO | NO SET | a | a | b | a | b | a | b | a | b | b |
| P1 | | 10 | (10) | (20) | (10) | (20) | (10) | (20) | (10) | (20) | (20) |
| P2 | | y1 | (y1) | (y2) | (y1) | (y2) | (y1) | (y2) | (y1) | (y2) | (y2) |
| P3 | | x1 | (x1) | (x2) | (x1) | (x2) | (x1) | (x2) | (x1) | (x2) | (x2) |
| P4 | | 0 | 3 | 0 | 2 | 3 | 1 | 2 | 0 | 1 | 0 |
| P5 | | 0 | 100 | 0 | 200 | 100 | 300 | 200 | 0 | 300 | 0 |
| P6 | | FFF | FF | FFF | FF | FF | FF | FF | FFF | FF | FFF |
| P7 | | 0 | 100 | 0 | 200 | 100 | 300 | 200 | 0 | 300 | 0 |
| ROM ADDRESS S19 | | 10 | 110 | 20 | 210 | 120 | 310 | 220 | 10 | 320 | 20 |
| GRAPHIC FORM | | α1 | α2 | β1 | α3 | β2 | α4 | β3 | α1 | β4 | β1 |

| | P5 | P6 | P7 |
|---|---|---|---|
| 0 | OFF | | |
| 1 | 300 | FF | 300 |
| 2 | 200 | FF | 200 |
| 3 | 100 | FF | 100 |

CONTAINED IN UPDATING REGISTER

| FRAME NO | SC1 | SC2 | SC8 | | SC9 | | SC10 | | SC11 | | SC12 |
|---|---|---|---|---|---|---|---|---|---|---|---|
| FIFO | NO SET | a | a | b | a | b | a | b | a | b | b |
| P1 | | 10 | (10) | 20 | (10) | (20) | (10) | (20) | (10) | (20) | (20) |
| P2 | | y1 | (y1) | y2 | (y1) | (y2) | (y1) | (y2) | (y1) | (y2) | (y2) |
| P3 | | x1 | (x1) | x2 | (x1) | (x2) | (x1) | (x2) | (x1) | (x2) | (x2) |
| P4 | | 0 | 4 | 0 | 3 | 4 | 2 | 3 | 1 | 2 | 1 |
| P5 | | - | - | - | - | - | - | - | - | - | - |
| P6 | | FFF | 0 | FFF | 0 | 0 | 0 | 0 | 0 | 0 | 0 |
| P7 | | 0 | 100 | 0 | 110 | 100 | 120 | 110 | 130 | 120 | 130 |
| ROM ADDRESS S19 | | 10 | 100 | 20 | 110 | 100 | 120 | 110 | 130 | 120 | 130 |
| GRAPHIC FORM | | 1 | 1 | 1 | 2 | 1 | 3 | 2 | 4 | 3 | 4 |

| | P5 | P6 | P7 |
|---|---|---|---|
| 0 | OFF | | |
| 1 | - | 0 | 130 |
| 2 | - | 0 | 120 |
| 3 | - | 0 | 110 |
| 4 | - | 0 | 100 |

CONTAINED IN UPDATING REGISTER

GRAPHICS PROCESSING METHOD AND APPARATUS THEREOF

BACKGROUND OF THE INVENTION

The present invention relates to a graphics processing method and the apparatus employing it. Specifically, the invention relates to a processing apparatus which displays dynamic (animated) images.

DESCRIPTION OF THE RELATED ART

The conventional graphic processing unit has a graphic ROM including a plurality of graphic forms (, or character graphics) which expresses a dynamic image. Since the dynamic image comprises a plurality of graphic forms, the graphic ROM outputs a sequence of graphic forms one by one. Therefore, a CPU sets a plurality of address values of the graphic ROM to the graphic processing unit one by one. In other words, the CPU must access to the graphic processing unit in large quantities. This causes degradation of the CPU's processing performance.

SUMMARY OF THE INVENTION

It is, therefore, an object of the present invention to provide an improved graphics processing unit which can display dynamic images.

It is another object of the present invention to provide a graphics processing unit that is operated by a CPU to display dynamic images, with a number of accesses of the apparatus by the CPU reduced.

According to an aspect of the present invention, a graphics processing apparatus is provided, comprising: a register to store a value equal to the number of dynamic images for each graphic form; a register to store the difference value or the logically calculated value between the address of a graphic form stored in the graphic ROM unit and the address of dynamic images stored in the graphic ROM unit; a register to store a WAIT value, which controls the dynamic image (frame) feeding speed; and a calculator to calculate the values and addresses used earlier.

According to another aspect of the present invention, a CPU presets and stores a value equal to the number of dynamic images for each graphic form, and the difference value or the logically calculated value between the address of a graphic form stored in the graphic ROM unit and the address of corresponding dynamic images stored in the graphic ROM unit, in registers of the graphics processing apparatus. If the number of dynamic images stored is zero, the graphics processing apparatus does not display dynamic images. If it is not zero, then with the value equaling the number of dynamic images stored as an address in the register, the stored difference value in terms of the graphic ROM unit or the logically calculated value or other related connections is taken out. This difference value or logically calculated value is subjected to a given calculation with an address for the graphic ROM unit corresponding to the graphic form to be displayed. Consequently, the address is changed into an address of the graphic ROM unit corresponding to dynamic images to be displayed. In addition, the number of dynamic images is decreased in accordance with the WAIT number. In the present invention, by setting a basic address for the graphic ROM unit, and also repeating the previously mentioned operation until the stored number of dynamic images becomes zero, the dynamic images will be successfully displayed while reducing the number of times the CPU needs to set addresses for the graphic ROM unit.

BRIEF DESCRIPTION OF DRAWINGS

Other features and advantages of the invention will be made more apparent by the detailed description that follows, taken in conjunction with the accompanying drawings, wherein.

DETAILED DESCRIPTION OF THE PREFERRED EMBODIMENTS

The conventional technologies will be described hereafter with reference to FIGS. 1 to 3: a flowchart, a circuit configuration, and a data configuration of a parameter RAM unit, respectively.

Figure 1:
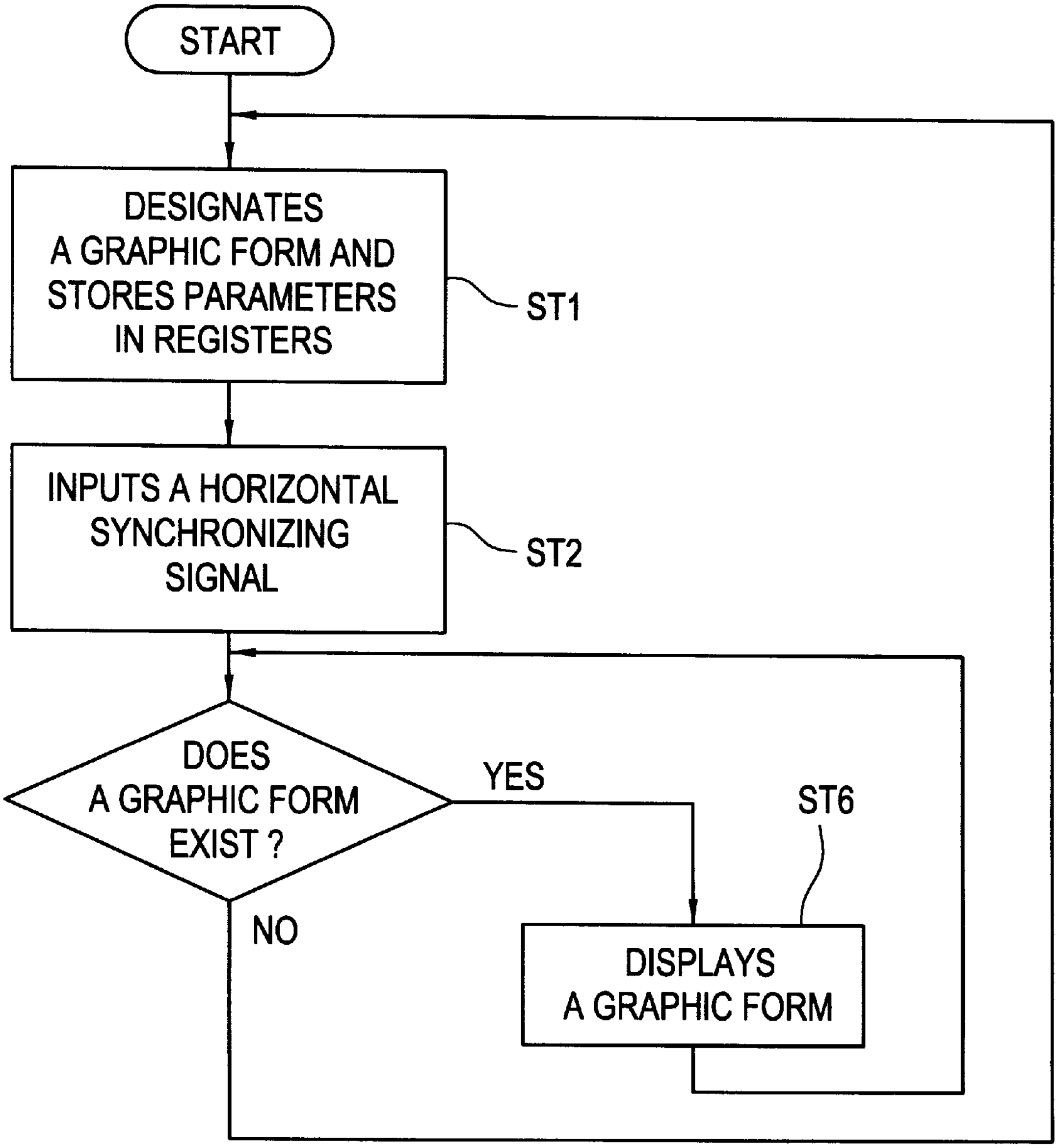
FIG. 1 is a flowchart showing the conventional procedure.

For display of a graphic form, the processes shown in the flowchart of FIG. 1 will be performed. Specifically, in step ST1, data and parameters necessary for display of a graphic form are both stored in a graphics processing unit (B2 shown in FIG. 2 In steps ST2 and ST6, the resultant graphic form will be displayed in sync with a horizontal synchronizing signal.

Figure 2:
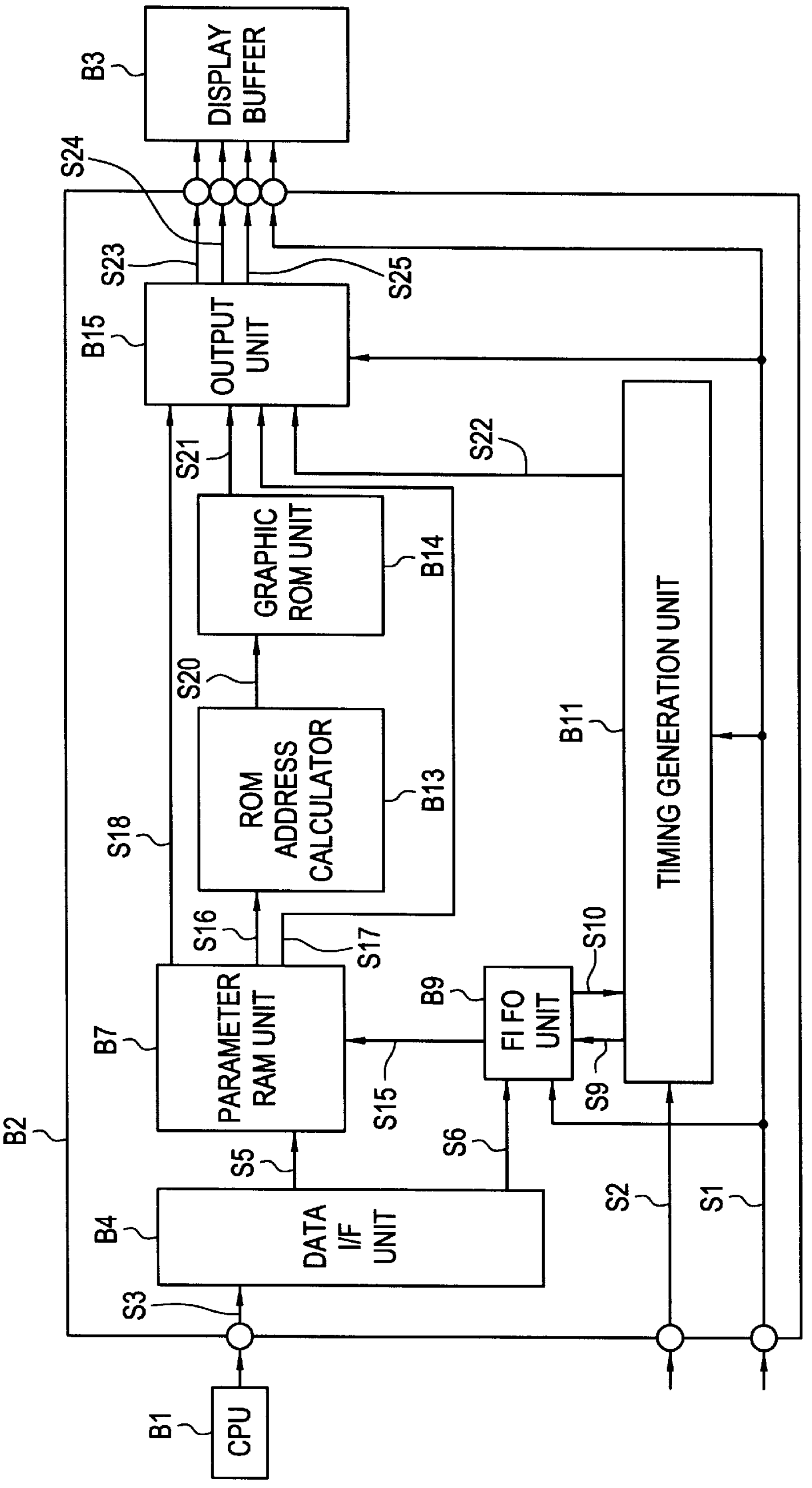
FIG. 2 shows a conventional circuit configuration.

With reference to FIG. 2, A CPU B1 generates parametric information (a I/F signal S3) necessary for the graphics processing unit B2 to display a graphic form. A DATA I/F unit B4 receives the I/F signal S3 from the CPU B1, outputting a parameter RAM write signal S5 if address information included in the signal S3 indicates data to be written in a parameter RAM unit B7 exists. Otherwise, if the address information indicates that a signal to be written in a FIFO unit B9 exists, a FIFO unit writing signal S6 will be output. Note that a variety of parametric information is written within the time period when a displayed image is not degraded by the writing operation e.g. a blanking period of the horizontal synchronizing signal.

Figure 3:
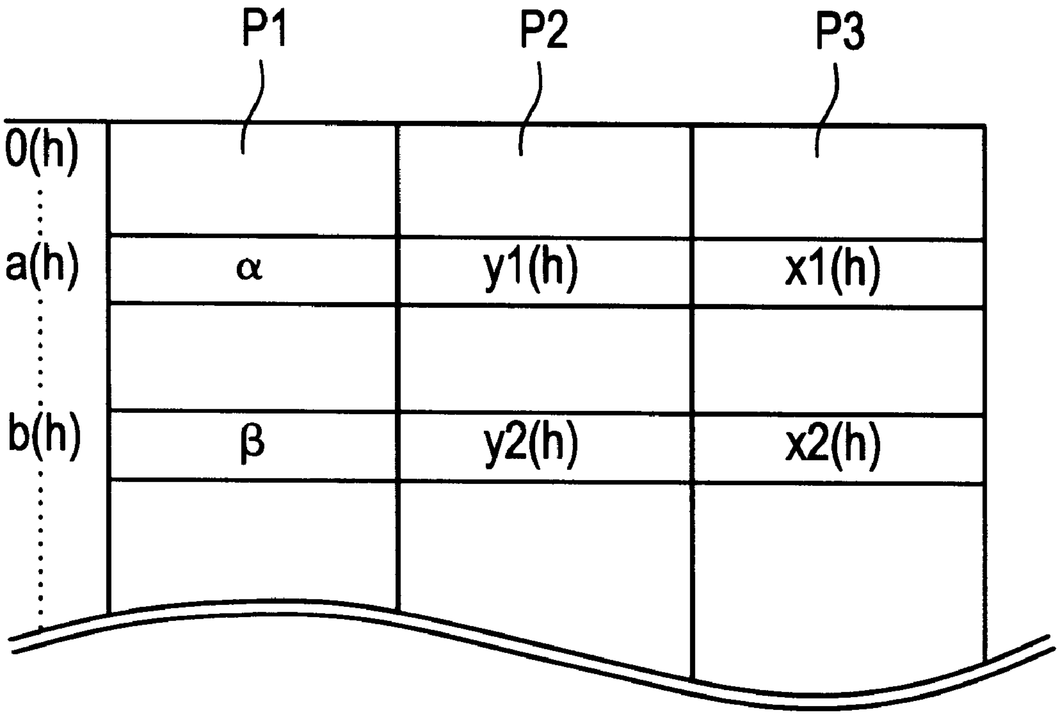
FIG. 3 shows an example of data configuration in a parameter RAM unit.

The parameter RAM unit B7 has a configuration as shown in FIG. 3. Wherein, for a graphic form, the following three values are stored: A graphic ROM original address P1; A Y-coordinate original value P2; and A X-coordinate original value P3.

Graphic form numbers are stored in the FIFO unit B9 in the order of displaying the corresponding respective graphic forms.

The graphics processing unit B2 receives a master clock signal S1 and a horizontal synchronizing signal S2 from an external system (not shown). A timing generation unit B11 receives the horizontal synchronizing signal S2, entering a display mode (an operating mode).

Whether a graphic form to be displayed exists is dependent upon whether data has been stored in the FIFO unit B9 before the horizontal synchronizing signal S2 is received.

The FIFO unit B9, when a graphic form number corresponding to a specific graphic form to be displayed has not been stored, outputs an empty signal S10 of a disable level to the timing generation unit B11. The timing generation unit B11 then receives the disable level of the empty signal S10, which halts the operation of the timing generation unit until the next horizontal synchronizing signal S2 is received. That is, the graphics processing unit B2 does not make any operation during the period. Note that the empty signal S10 has two levels: the disable level and the enable level.

Otherwise, when a graphic form number is stored in the FIFO unit B9, the empty signal S10 of the enable level is output, indicating that a graphic form to be displayed exists. When the timing generation unit B11 receives the enable level, it outputs a request signal S9 to the FIFO unit B9. The FIFO unit B9 then receives the request signal S9, outputting the parameter RAM address signal S15, which corresponds to a graphic form number. The graphic form designated by the graphic form number will be displayed later. When the parameter RAM unit B7 receives the address signal S15, it outputs the following three signals: a graphic ROM original address signal S16; a Y-coordinate original signal S17; and a X-coordinate original signal S18. The graphic ROM original address signal S16 is converted into a graphic ROM address signal S20 by the ROM address calculator B13.

Graphic forms to be displayed are stored and mapped in the graphic ROM unit B14. When the graphic ROM address signal S20 is received, a corresponding graphic form is output as a graphic ROM unit data signal S21. The timing generation unit B11 includes a counter (not shown) to count the master clock S1. It outputs display start signal S22 to an output unit B15 when the graphic ROM unit data signal S21 is read out. With a predetermined interval value set in the counter of the timing generation unit B11, the display start signal S22 and other related connections are generated at given times. When receiving the display start signal S22, the output unit B15 outputs a display data signal S23, a display buffer write enable signal S24, and a display buffer address signal S25 to a display buffer B3; Wherein, these output signals are generated in accordance with the Y-coordinate original signal S17, a X-coordinate original signal S18, and the graphic ROM unit data signal S21. The display buffer B3 is stored with a frame of image information, in which graphic forms, each corresponding to a designated address, are mapped.

When several graphic forms have been stored in the FIFO unit B9, in other words, when several graphic forms are displayed in one frame, despite the fact that one of the graphic forms has been transmitted, the empty signal S10 is kept at the enable level, and the timing generation unit B11 maintains the output of the request signal S9, allowing to continuously display. The operation will be repeated until no data is stored in the FIFO unit B9 (i.e., until there are no more graphic forms to be displayed) . When no graphic form is stored in the FIFO unit B9, the empty signal S10 turns into of the disable level, the display operation halts.

By executing the previous procedure, a frame of graphic forms is displayed. By repeating this procedure, dynamic images are displayed.

Figure 5:
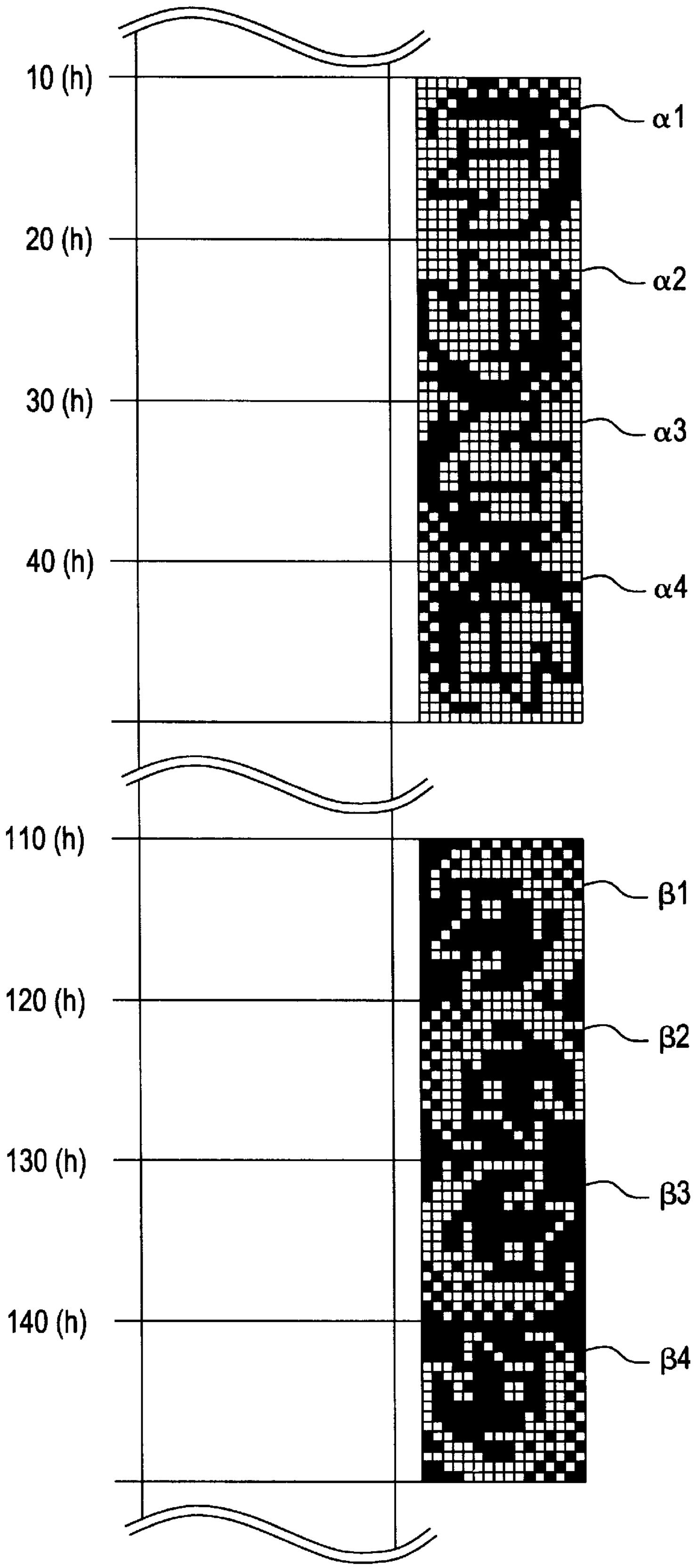
FIG. 5 shows an example of data configuration in a graphic ROM unit of conventional circuit and the first embodiment.
Figure 6:
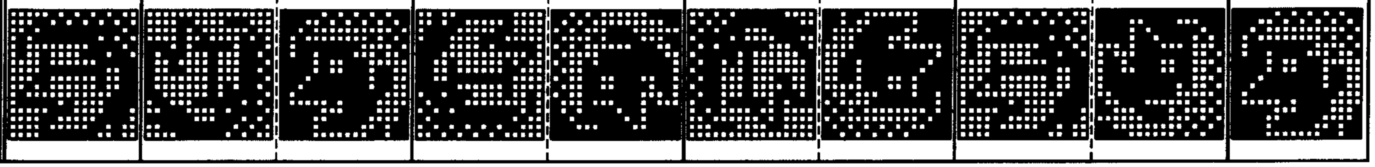
FIG. 6 shows a conventional example of a parametric set.

In the following description, the procedures of setting values in the parameter RAM unit B7, and graphic form numbers in the FIFO unit B9 for display of the frames shown in FIG. 4 will be described with reference to the data configuration of a graphic ROM unit B14 shown in FIG. 5, and a parametric set example shown in FIG. 6. In FIG. 6, values in parentheses ( ) are unnecessary to be reset because they have already been set during the previous operation.

Note that in the following description, we assume that each of the graphic form numbers corresponds to a specific address in the parameter RAM unit B7.

Figure 4:
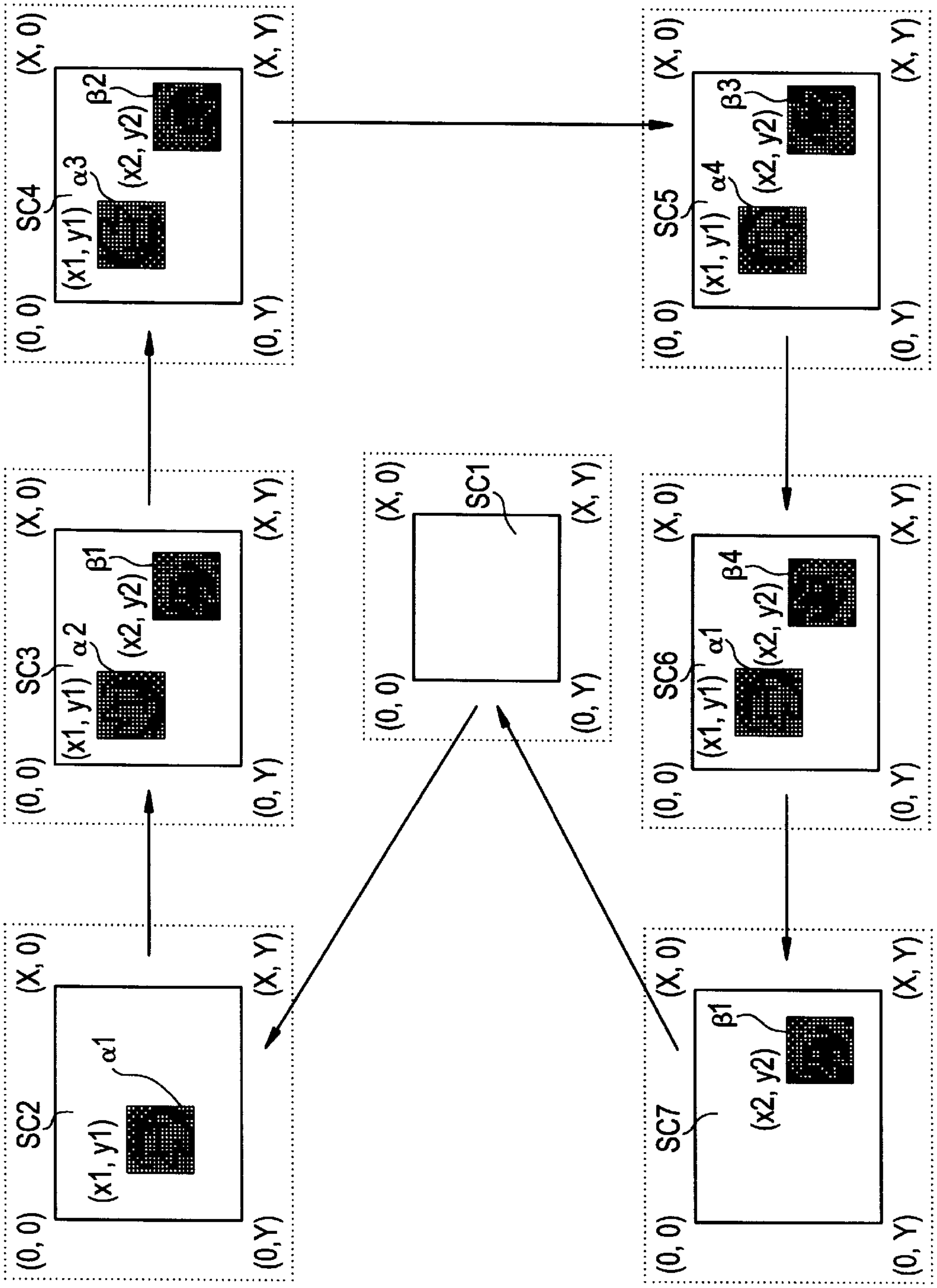
FIG. 4 shows frames to be displayed.

As shown in FIG. 4, we assume that dynamic images are displayed in the order of SC1, SC2, SC3, SC4, SC5, SC6, SC7, and SC1. There are two groups of graphic forms to be displayed: We define “first group” to mean a graphic form number a(h), and “second group” to mean a graphic form number b(h) which can be stored in the FIFO unit B9.

FRAME SC1:

For frame SC1, no graphic form is displayed and therefore the CPU B1 does not store a graphic form number in the FIFO unit B9. In this manner, frame SC1 is displayed.

FRAME SC2:

For frame SC2, graphic form $\alpha$1 mapped on the address 10(*h*) in the graphic ROM unit B14 is displayed as a graphic form of the first group at coordinates (x1, y1) . However, a graphic form of the second group is not displayed.

The CPU B1 stores a(h) as a graphic form number to the FIFO unit B9. Also, the CPU B1 stores a graphic ROM original address P1 (=10(*h*)), a Y-coordinate original value P2 (=y1), and an X-coordinate original value P3 (=x1) to the address a(h) in the parameter RAM unit B7. Therefore, the graphic form $\alpha$1 is displayed as a graphic form of the first group in accordance with the graphic ROM address signal S20 (=10(*h*)). In the above manner, frame SC2 is displayed.

FRAME SC3:

For frame SC3, graphic form $\alpha$2 mapped on the address 20(*h*) in the graphic ROM unit B14 is displayed, as a graphic form of the first group, at coordinates (x1, y1). In addition, graphic form $\beta$1 mapped on the address 110(*h*) in the graphic ROM unit B14 is displayed as a graphic form of the second group, at the coordinates (x2, y2).

The CPU B1 then stores a(h) and b(h) as graphic form numbers (the corresponding graphic forms of which are displayed) to the FIFO unit B9. A graphic ROM original address P1 (=20(*h*)) is then stored (overwritten) to the address a(h) in the parameter RAM unit B7 by the CPU B1. It is noted that the Y-coordinate original value P2 (=y1) and the X-coordinate value P3 (=x1) on the address a(h) are all unnecessary to be stored again because they have already been stored in the process of displaying frame SC2. Subsequently, the graphic ROM original address P1 (=110 (*h*)), the Y-coordinate original value P2 (=y2), and the X-coordinate original value P3 (=x2) are all stored to the address b(h) in the parameter RAM unit B7 by the CPU B1. Graphic form α2 of the first group is displayed in accordance with the graphic ROM address signal S20 (=20(*h*)) Graphic form β1 of the second group is displayed in accordance with the graphic ROM address signal S20 (=110 (*h*)). In the above manner, frame SC3 is displayed.

FRAME SC4:

For frame SC4, graphic form α3 mapped on the address 30(*h*) in the graphic ROM unit B14 is displayed as a graphic form of the first group, at coordinates (x1, y1). In addition, the graphic form β2 of the second group mapped on the address 120(*h*) in the graphic ROM unit B14 is displayed at the coordinates (x2, y2).

The CPU B1 then stores a(h) and b(h) as graphic form numbers to the FIFO unit B9. The graphic ROM original address P1 (=30(*h*)) is then stored to the address a(h) in the parameter RAM unit B7 by the CPU B1. It is noted that the Y-coordinate original value P2 (=y1) and the X-coordinate value P3 (=x1) on the address a(h) are all unnecessary to be stored again. Subsequently, the graphic ROM original address P1 (=120(*h*)) is stored to the address b(h) in the parameter RAM unit B7 by the CPU B1. The Y-coordinate original value P2 (=y2), and the X-coordinate original value P3 (=x2) on the address b(h) are all unnecessary to be stored again because they have already been stored in the process of displaying frame SC3. The graphic form α3 in the first group is displayed in accordance with the graphic ROM address signal S20 (=30(*h*)) The graphic form β2 of the second group is displayed in accordance with the graphic ROM address signal S20 (=120(*h*)). In the above manner, frame SC4 is displayed.

FRAME SC5:

For frame SC5, graphic form α4 mapped on the address 40(*h*) in the graphic ROM unit B14 is displayed as a graphic form of the first group at coordinates (x1, y1) . In addition, graphic form β3 mapped on the address 130(*h*) in the graphic ROM unit B14 is displayed as a graphic form of the second group, at the coordinates (x2, y2).

The CPU B1 then stores a(h) and b(h) as graphic form numbers to the FIFO unit B9. The graphic ROM original address P1 (=40(*h*)) is then stored to the address a(h) in the parameter RAM unit B7 by the CPU B1. It is noted that the Y-coordinate original value P2 (=y1) and the X-coordinate value P3 (=x1) on the address a(h) are unnecessary to be stored again. Subsequently, the graphic ROM original address P1 (=130(*h*)) is stored to the address b(h) in the parameter RAM unit B7 by the CPU B1. It is noted that the Y-coordinate original value P2 (=y2), and the X-coordinate original value P3 (=x2) on the address b(h) are unnecessary to be stored again. The graphic form α4 of the first group is displayed in accordance with the graphic ROM address signal S20 (=40(*h*)). The graphic form β3 of the second group is displayed in accordance with the graphic ROM address signal S20 (=130(*h*)) In the above manner, frame SC5 is displayed.

FRAME SC6:

For frame SC6, the graphic form α1 mapped on the address 10(*h*) in the graphic ROM unit B14 is displayed as a graphic form of the first group on coordinates (x1, y1). In addition, the graphic form β4 mapped on the address 140(*h*) in the graphic ROM unit B14 is displayed as a graphic form of the second group, at the coordinates (x2, y2).

The CPU B1 then stores a(h) and b(h) as graphic form numbers to the FIFO unit B9. The graphic ROM original address P1 (=10(*h*)) is then stored to the address a(h) in the parameter RAM unit B7 by the CPU B1. It is noted that the Y-coordinate original value P2 (=y1) and the X-coordinate value P3 (=x1) on the address a(h) are both unnecessary to be stored again. Subsequently, the graphic ROM original address P1 (=140(*h*)) is stored to the address b(h) in the parameter RAM unit B7 by the CPU B1. It is noted that the Y-coordinate original value P2 (=y2) and the X-coordinate original value P3 (=x2) on the address b(h) are unnecessary to be stored again. The graphic form α1 of the first group is displayed in accordance with the graphic ROM address signal S20 (=10(*h*)). The graphic form β4 of the second group is displayed in accordance with the graphic ROM address signal S20 (=140(*h*)) In the above manner, frame SC6 is displayed.

FRAME SC7:

For frame SC7, a graphic form of the first group is not displayed. Instead, the graphic form β1 mapped on address 110(*h*) in the graphic ROM unit B14 is displayed as a graphic form of the second group at the coordinates (x2, y2).

The CPU B1 stores b(h) as a graphic form number to the FIFO unit B9. The graphic ROM original address P1 (=110 (*h*)) is then stored to the address b(h) in the parameter RAM unit B7 by the CPU B1. It is noted that the Y-coordinate original value P2 (=y2) and the X-coordinate value P3 (=x2) on the address b(h) are both unnecessary to be stored again. The graphic form β1 of the second group is displayed in accordance with the graphic ROM address signal S20 (=110 (*h*)). In the above manner, frame SC7 is displayed.

Returning to the beginning of the cycle, frame SC1 will be displayed again.

In the manner explained above, the dynamic images shown in FIG. 4 are displayed.

One problem with the aforementioned technology is that whenever a frame from one of the groups is changed, the CPU must access to set the graphic ROM original address P1. This causes degradation of the CPU's processing performance.

Another problem is that in the case of displaying several frames, low processing performance of the CPU will result in necessary instructions not reaching the graphics processing apparatus, meaning that some frames will not be displayed.

Still another problem is that for display of a graphic form in one of the two groups mentioned above(first group and second group), the CPU has to set the graphic ROM addresses, corresponding to primitive graphic forms and other graphic forms for dynamic images, respectively. This causes for inconvenient management of the relations among dynamic images to be displayed.

FIRST EMBODIMENT

A first embodiment according to the present invention will be described in detail with reference to the flowchart of FIG. 7, the circuit configuration of FIG. 8, the data configuration of a parameter RAM unit shown in FIG. 9, and the data configuration of an updating register shown in FIG. 10. Note that explanations of elements already contained in the conventional circuit (shown in FIG. 2) are omitted.

Figure 7:
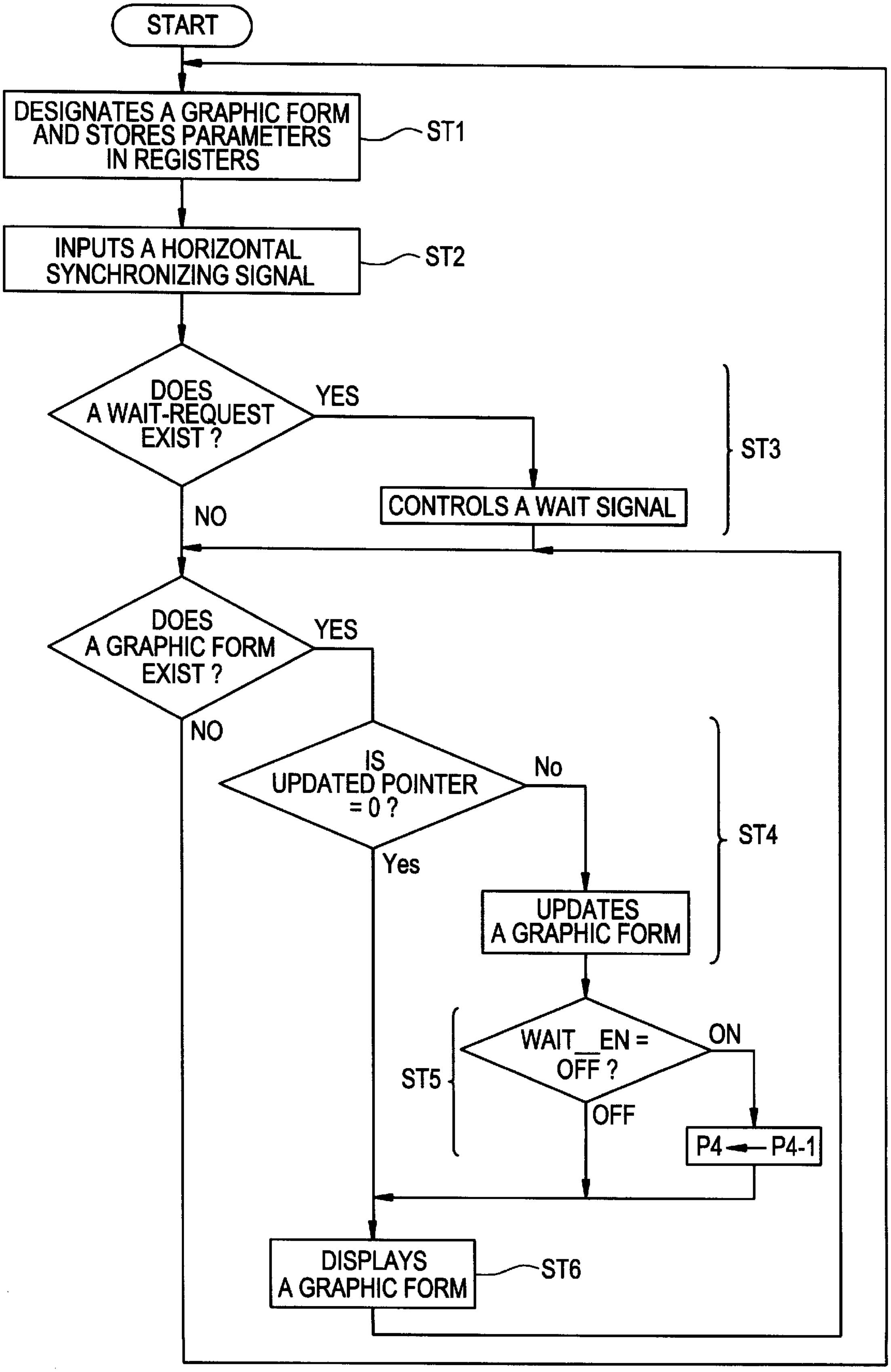
FIGS. 7 is a flowchart showing the procedure of a first and second embodiments.
Figure 8:
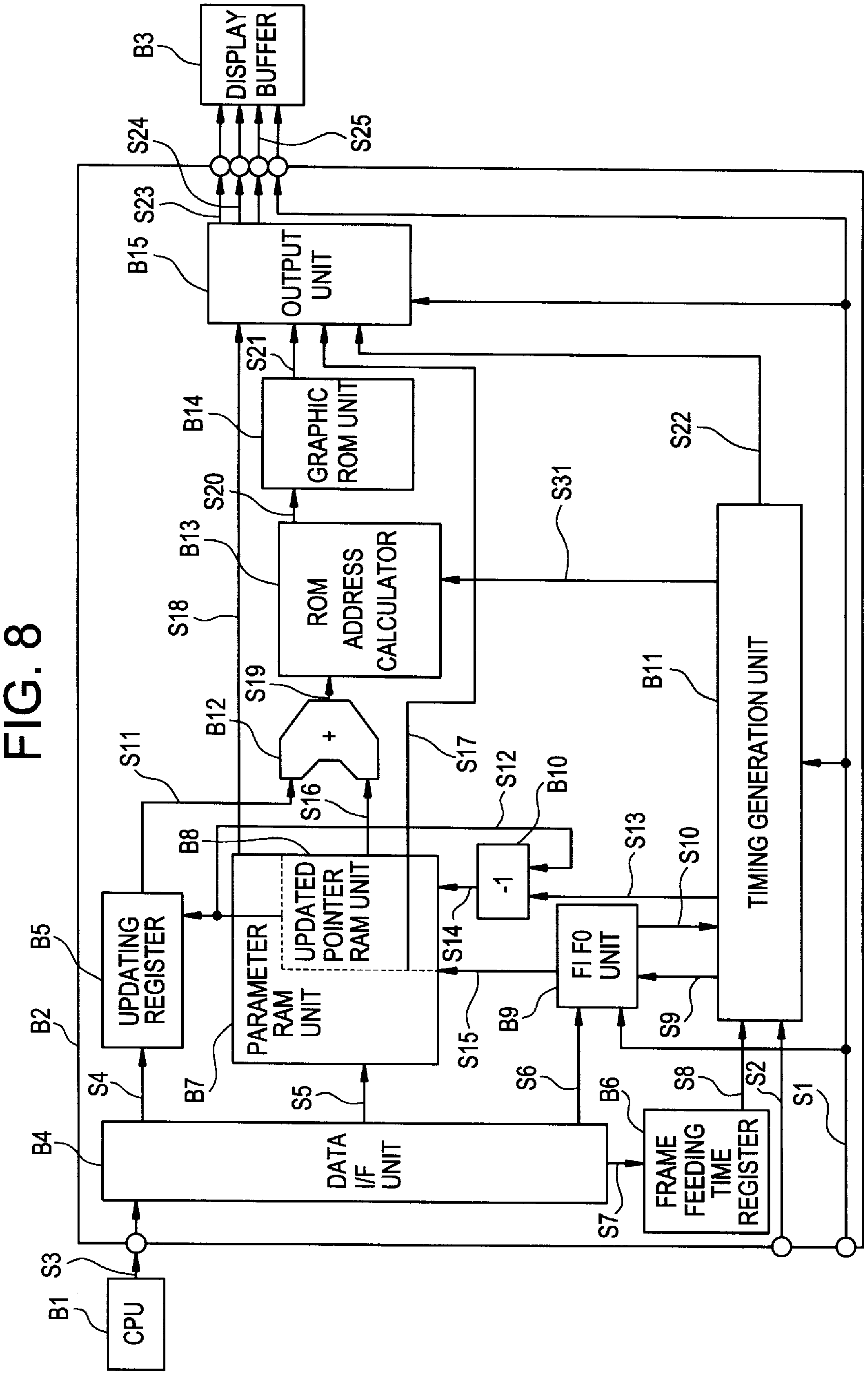
FIG. 8 shows a circuit configuration of the first embodiment.

In the first embodiment, a graphic form will be displayed on a display by the following procedure as shown in FIG. 7. In step ST1, data and parameters for displaying a graphic form are sent to the graphics processing unit (B2 in FIG. 8). In step ST2, upon reception of a horizontal synchronizing signal S2, the graphics processing unit (B2 in FIG. 8) starts its operation. In step ST3, the timing generation unit B11 counts the number of received horizontal synchronizing signals S2. Until the number reaches a given value (a predetermined value), the timing generation unit B11 sends itself a wait request so that it does not move on to the next step. This 'given value' determines the updated timing of a frame. Frames are generally displayed at a rate of thirty to sixty per second, because of which a given frame is necessarily repeated several times before the next frame is shown. The updated timing of a frame determines when that frame is displayed, and for how many times that same frame is displayed. In step ST4, if a graphic form to be displayed exists, and an updated pointer value is not equal to zero, the displayed graphic form is updated. In step ST5, the updated pointer value is decrement if a given wait condition is satisfied (that is, if a WAIT_EN signal (S13 in FIG. 8, which will be explained later) is activated). In step ST6, a graphic form is displayed. The operation of the first embodiment will now be described in detail with reference to FIG. 8.

The CPU B1 generates parametric information (I/F signal S3) necessary for the graphics processing unit B2 to display a graphic form. A DATA I/F unit B4 receives the I/F signal S3, outputting an updating register write signal S4, a parameter RAM unit write signal S5, a FIFO write signal S6, and a frame feeding time register write signal S7, dependent upon address information included in the I/F signal S3.

Figure 9:
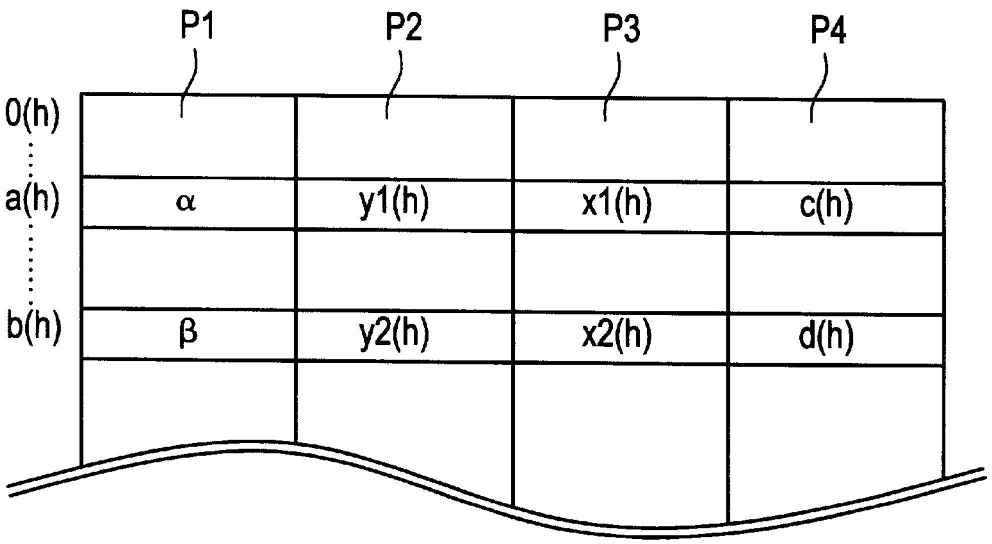
FIG. 9 shows a data configuration of the parameter RAM unit of the first and second embodiments.

A parameter RAM unit B7 is configured as shown in FIG. 9. A graphic ROM original address P1, a Y-coordinate original value P2, and an X-coordinate original value P3 are stored for a graphic form. The parameter RAM unit B7 comprises an updated pointer RAM unit B8, in which an updated value P4 (value equal to the number of dynamic frames to be displayed) is stored.

The FIFO unit B9 is configured in the same manner as that of the conventional technology (shown in FIG. 2), with the stored elements being graphic form numbers.

Figure 10:
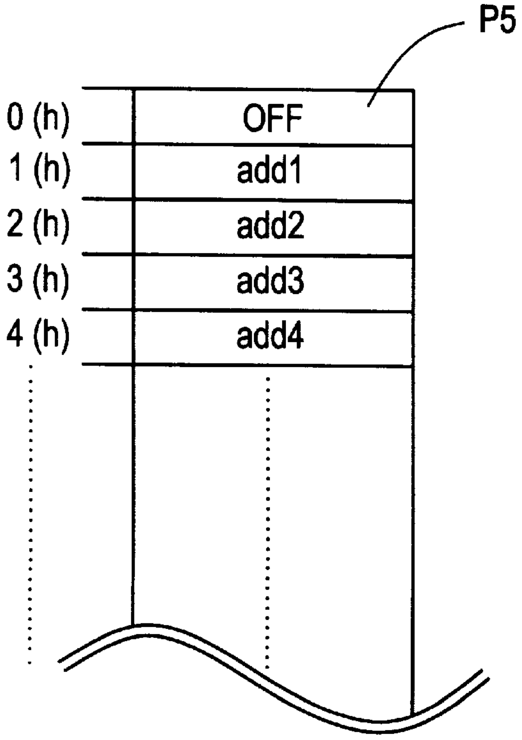
FIG. 10 shows a data configuration of an updating register of the first embodiment.

An updating register B5 is configured as shown in FIG. 10, being stored with the difference between the original address of a primitive graphic form stored in the graphic ROM unit and the original address of corresponding dynamic images stored in the graphic ROM unit.

In the course of displaying an image, a certain number of frames and a certain amount of time is required. This information is stored in the frame feeding time register B6. The frame feeding time register B6 outputs a WAIT setting signal S8 representing the stored number to the timing generation unit B11. The timing generation unit B11 counts the number of horizontal synchronizing signals S2 received and generates a WAIT_EN signal S13 at a predetermined time in accordance with the WAIT setting signal S8. In other words, when the WAIT setting signal S8 (the stored number) is equal to the number of horizontal synchronizing signals received, a WAIT_EN signal S13 of the enable level is generated.

The graphics processing unit B2 receives a master clock signal S1 and a horizontal synchronizing signal S2 from an external system (not shown). The timing generation unit B11 receives the horizontal synchronizing signal S2, entering a display state (an operating state).

In the same manner as that of the conventional technology (shown in FIG. 2), whether or not a graphic form to be displayed exists is dependent upon whether data has been stored in the FIFO unit B9 before the horizontal synchronizing signal S2 is received. When the FIFO unit B9 does not contain a graphic form number, it outputs an empty signal S10 of the disable level. When it does contain a graphic form number, the FIFO unit outputs the empty signal S10 of the enable level.

If it receives an empty signal of the enable level, the timing generation unit B11 outputs a request signal S9 to the FIFO unit B9. The FIFO unit B9 receives the request signal S9, outputting a parameter RAM address signal S15 corresponding to the graphic form number (the corresponding graphic form of which is displayed), to a parameter RAM unit B7. The parameter RAM unit B7 receives the parameter RAM address signal S15, outputting a graphic ROM original address signal S16, a Y-coordinate original signal S17, and a X-coordinate original signal S18. At the same time, the updated pointer RAM unit B8 outputs an updated pointer signal S12.

The updated pointer signal S12 corresponds to the value stored in the updated pointer RAM unit B8. As mentioned earlier, this value denotes the number of dynamic images. For display of a primitive graphic form, the updated value P4 (value equal to the number of dynamic frames to be displayed) is set so that an output signal S11 (difference value) meaning zero is output from the updating register B5. Specifically, the output signal S11 of 0(*h*) is output to an adder (address updating unit) B12. The parameter RAM unit B7 outputs the graphic ROM original address signal S16 to the adder B12. The adder B12 then adds the output signal S11 to the graphic ROM original address signal S16, calculating an updated graphic ROM original address signal S19. In this case, the updated graphic ROM original address signal S19 is equivalent to the graphic ROM address signal S16.

What happens next is already well understood in the conventional technology (shown in FIG. 2). Specifically, the ROM address calculation unit B13 outputs a graphic ROM address signal S20 dependent upon the updated graphic ROM address signal S19. The graphic ROM unit B14 then outputs the graphic form indicated by signal S20 to an output unit B15. When the output unit B15 receives a display start signal S22 from the timing generation unit B11, it generates a display data signal S23, a display buffer write enable signal S24, and a display buffer address signal S25, dependent upon the Y-coordinate original signal S17, the X-coordinate original signal S18, and the graphic ROM unit data signal S21. It outputs these signals to the display buffer B3. Therefore, the display buffer B3 for a frame is stored with the graphic form.

When several graphic form numbers have been stored in the FIFO unit B9, the display operation is repeated until an empty signal S10 of the disable level is received, as in the conventional technology (shown in FIG. 2).

For display of graphic forms in dynamic images, the updated value P4 has to be given a value. In the embodiment, the address value of the updating register B5 is given to the updated value P4. The updating register B5 then outputs the difference value as output signal S11 to the adder B12. The adder B12 then adds the output signal S11 to the graphic ROM original address signal S16, calculating the updated graphic ROM original address signal S19.

The subsequent process, leading to the display of dynamic images, has already been mentioned.

In the embodiment, as described above, the same frame is displayed several times. Therefore, the display buffer B3 is stored with the same graphic form to be displayed a certain number of times before next graphic form is displayed. In other words, the dynamic graphic form to be displayed will be updated every several frames. This process can be performed with the help of a pointer update unit B10 and use of a WAIT_EN signal S13. Specifically, to update the displayed graphic form, the ponter updating unit B10 decreases the updated pointer signal S12 (the updated value P4) by one, storing the decreased set value as a new updated value P4, in the same location of the updated pointer RAM unit B8. Wherein, the ponter updating unit B10 operates only when the WAIT_EN signal S13 is of the enable level, allowing the graphic form to be updated every several frames.

Figure 11:
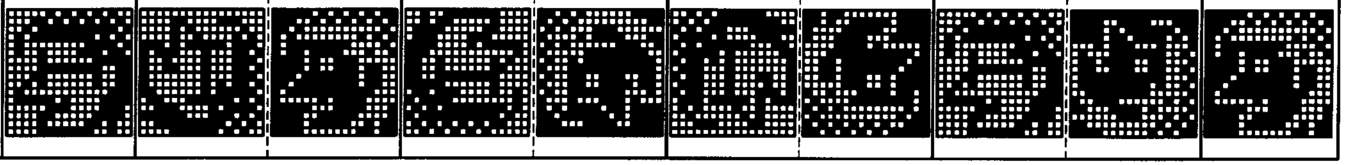
FIG. 11 shows an example of a parametric set of the first embodiment.

In the following description, the procedures of setting values in the parameter RAM unit B7, the updated pointer RAM unit B8, and graphic form numbers in the FIFO unit B9 for display of the frames shown in FIG. 4 will be described with reference to the data configuration of a graphic ROM unit B14 shown in FIG. 5, and a parametric set example shown in FIG. 11. In FIG. 11, values in parentheses ( ) are unnecessary to be reset because they have already been set during the previous operation. Also, in FIG. 11, shaded values will be automatically reset after being displayed.

It is assumed in the following description that a graphic form number corresponds to an address in the parameter RAM unit B7. It is further assumed that dynamic images will be displayed in the following order: SC1, SC2, SC3, SC4, SC5, SC6, SC7, and SC1. The graphic forms to be displayed are defined into two groups. We define "first group" to mean a graphic form number a(h), and "second group" to mean a graphic form number b(h), both of which can be stored in the FIFO unit B9. In FIG. 5, graphic forms α1 and β1 are defined as primitive graphic forms, while graphic forms α2 to α4 and β2 to β4 are defined as dynamic images.

Note that the updating register B5 is stored with difference values P5: the address 1(*h*)=30(*h*) ; the address 2(*h*)=20(*h*); and the address 3(*h*)=10(*h*).

FRAME SC1:

For frame SC1, no graphic form is displayed. The CPU B1 therefore does not store a graphic form number in the FIFO unit B9. In the above manner, frame SC1 is displayed.

FRAME SC2:

For frame SC2, the graphic form α1 mapped on the address 10(*h*) in the graphic ROM unit B14 is displayed as a graphic form of the first group at the coordinates (x1, y1) in the display. However, a graphic form of the second group is not displayed.

The CPU B1 stores a(h) as a graphic form number to the FIFO unit B9. Also, the CPU B1 stores a graphic ROM original address P1 (=10(*h*)), a Y-coordinate original value P2 (=y1), and a X-coordinate original value P3 (=x1) to the address a(h) in the parameter RAM unit B7. In addition, the CPU B1 stores the updated value P4 (=0(*h*)) to the address a(h) in the updated pointer RAM unit B8. From the fact that the value P4 (=0(*h*)), it is determined that no dynamic images have been displayed. In addition, since the graphic ROM address signal S19 is equal to 10(*h*), the graphic form α1 is displayed as a graphic form of the first group. In the above manner, frame SC2 is displayed.

FRAME SC3:

For frame SC3, the graphic form α2 mapped on the address 20(*h*) in the graphic ROM unit B14 is displayed, as a graphic form of the first group at the coordinates (x1, y1) in the display. In addition, the graphic form β1 mapped on the address 110(*h*) in the graphic ROM unit B14 is displayed, as a graphic form of the second group, at the coordinates (x2, y2) in the display.

The CPU B1 stores a(h) and b(h) as graphic form numbers to the FIFO unit B9. Since the graphic ROM original address P1 (=10(*h*)), the Y-coordinate original value P2 (=y1), and the X-coordinate original value P3 (=x1) are all stored on the address a(h) in the parameter RAM unit B7, for frame SC2, they are unnecessary to be stored again by the CPU B1. Subsequently, the CPU B1 stores the graphic ROM original address P1 (=110(*h*)), a Y-coordinate original value P2 (=y2), and an X-coordinate original value P3 (=x2) to the address b(h) in the parameter RAM unit B7. In addition, the CPU B1 stores the value P4 (=3(*h*)) to the address a(h) in the updated pointer RAM unit B8, and the value P4 (=0(*h*)) is stored to the address b(h). For the first group, since the value P4 on the address a(h) is equal to 3(*h*), a difference value P5 (=10(*h*)) is taken out and added to the graphic ROM original address P1 (=10(*h*)) corresponding to the graphic form α1. The resulting graphic ROM address signal S19 is 20(*h*) . Therefore, the graphic form α2 is displayed. After that, the value P4 on the address a(h) in the updated pointer RAM unit B8 is automatically reset into 2(*h*). For the second group, since the value P4 on the address b(h) is equal to 0(*h*), the graphic ROM address signal S19 becomes 110(*h*). The graphic form β1 is then displayed. In the above manner, frame SC3 is displayed.

FRAME SC4:

For frame SC4, the graphic form α3 mapped on the address 30(*h*) in the graphic ROM unit B14 is displayed, as a graphic form of the first group, at the coordinates (x1, y1) in the display. In addition, the graphic form β2 mapped on the address 120(*h*) in the graphic ROM unit B14 is displayed as a graphic form of the second group, at the coordinates (x2, y2) in the display.

The CPU B1 then stores a(h) and b(h) as graphic form numbers to the FIFO unit B9. Since the address values P1, P2, and P3 in the parameter RAM unit B7 on the address a(h) and b(h) were already set during the display operation of frame SC2 and SC3, they are unnecessary to be stored again. The CPU B1 stores the value P4 (=3(*h*)) to the address b(h) in the updated pointer RAM unit B8. At this time, the value P4 on the address a(h) (=2(*h*)) is already set by the ponter updating unit B10. For the first group, since the value P4 on the address a(h) is equal to 2(*h*), the difference value P5 on the address a(h) (=20(*h*)) is taken out, being added to the graphic ROM original address P1 (=10(*h*)) corresponding to the graphic form α1. Consequently, the graphic address signal S19 becomes 30(*h*), and the graphic form α3 is displayed. Thereafter, the value P4 on the address a(h) in the updated pointer RAM unit B8 is automatically reset into 1(*h*). For the second group, since the value P4 on the address b(h) is equal to 3(*h*), the difference value P5 on the address b(h) (=10(*h*)) is taken out and added to the graphic ROM original address P1 (=110(*h*)) corresponding to the graphic form β1. Consequently, the resulting graphic ROM address signal S19 becomes 120(*h*) . The graphic form β2 is then displayed. Thereafter, the value P4 on the address b(h) in the updated pointer RAM unit B8 is automatically reset into 2(*h*). In the above manner, frame SC4 is displayed.

FRAME SC5:

For frame SC5, the graphic form α4 mapped on the address 40(*h*) in the graphic ROM unit B14 is displayed, as a graphic form of the first group, at the coordinates (x1, y1) in the display. In addition, the graphic form β3 mapped on the address 130(*h*) in the graphic ROM unit B14 is displayed, as a graphic form of the second group, at the coordinates (x2, y2) in the display.

The CPU B1 then stores a(h) and b(h) as graphic form numbers to the FIFO unit B9. Here, the address values P1, P2, and P3 in the parameter RAM unit B7 are unnecessary to be stored again by the CPU B1. The value P4 on the address a(h) and b(h) are also unnecessary to be set again by the CPU B1. The value P4 (=1(*h*)) has been stored on the address a(h) in the updated pointer RAM unit B8, while the value P4 (=2(*h*)) has been stored on the address b(h) . For the first group, since the value P4 on the address a(h) is equal to 1(*h*), the difference value P5 on the address a(h) (=30(*h*)) is taken out and added to the graphic ROM original address P1 (=10(*h*)) corresponding to the graphic form α1. Consequently, the graphic address signal S19 becomes 40(*h*), and the graphic form α4 is displayed. Thereafter, the value P4 on the address a(h) in the updated pointer RAM unit B8 is automatically reset to 0(*h*). For the second group, since the value P4 on the address b(h) is equal to 2(*h*), the difference value P5 on the address b(h) (=20(*h*)) is taken out and added to the graphic ROM original address P1 (=110(*h*)) corresponding to the graphic form β1. The resulting graphic ROM address signal S19 becomes 130(*h*). The graphic form β3 is then displayed. Thereafter, the value P4 on the address b(h) in the updated pointer RAM unit B8 is automatically reset into 1(*h*) . In above manner, frame SC5 is displayed.

FRAME SC6:

For frame SC6, the graphic form α1 mapped on the address 10(*h*) in the graphic ROM unit B14 is displayed, as a graphic form of the first group, at the coordinates (x1, y1) in the display. In addition, the graphic form β4 mapped on the address 140(*h*) in the graphic ROM unit B14 is displayed, as a graphic form of the second group, at the coordinates (x2, y2) in the display.

The CPU B1 then stores a(h) and b(h) as graphic form numbers to the FIFO unit B9. Here, the address values P1, P2, and P3 in the parameter RAM unit B7 are all unnecessary to be set again by the CPU B1. The value P4 on the address a(h) and b(h) are also unnecessary to be set again by the CPU B1. The value P4 (=0(*h*)) has been stored on the address a(h) in the updated pointer RAM unit B8, while the value P4 (=1(*h*)) has been stored on the address b(h). For the first group, since the value P4 on the address a(h) is equal to 0(*h*), the graphic ROM address signal S19 is 10(*h*). The graphic form α1 is then displayed. For the second group, since the value P4 on the address b(h) is equal to 1(*h*), the difference value P5 (=30(*h*)) is taken out and added to the graphic ROM original address P1 (=110(*h*)) corresponding to the graphic form β1. Consequently, the resultant graphic address signal S19 becomes 140(*h*), and the graphic form β4 is displayed. Thereafter, the value P4 on the address b(h) in the updated pointer RAM unit B8 is automatically reset into 0(*h*). In the above manner, frame SC6 is displayed.

FRAME SC7:

For frame SC7, a graphic form for the first group is not displayed. However, the graphic form β1 mapped on the address 110(*h*) in the graphic ROM unit B14 is displayed, as a graphic form of the second group, at the coordinates (x2, y2) in the display.

The CPU B1 then stores b(h) as a graphic form number to the FIFO unit B9. Here, the address values P1, P2, and P3 in the parameter RAM unit B7 are all unnecessary to be set again by the CPU B1. The value P4 is also unnecessary to be set again by the CPU B1. The value P4 (=0(*h*)) has been stored on the address b(h) in the updated pointer RAM unit B8. Since the value P4 is equal to 0(*h*) for the second group, the graphic ROM address signal S19 is 110(*h*). The graphic form β1 is then displayed. In the above manner, frame SC7 is displayed.

Frame SC1 will then be displayed again.

In the above manner, the frames shown in FIG. 4 are displayed.

As should be apparent from the explanation above, for display of a single graphic form, the graphic ROM original address P1 should be set only once, as described in the embodiment. In other words, the embodiment of the present invention needs to access the graphic ROM original address P1 only once for display of N dynamic images, as opposed to the conventional method used, whereby the CPU B1 has to access the graphic ROM address N times. Thus, this method needs to access the graphic ROM unit (N−1) fewer times, which saves computing power.

SECOND EMBODIMENT

Figure 12:
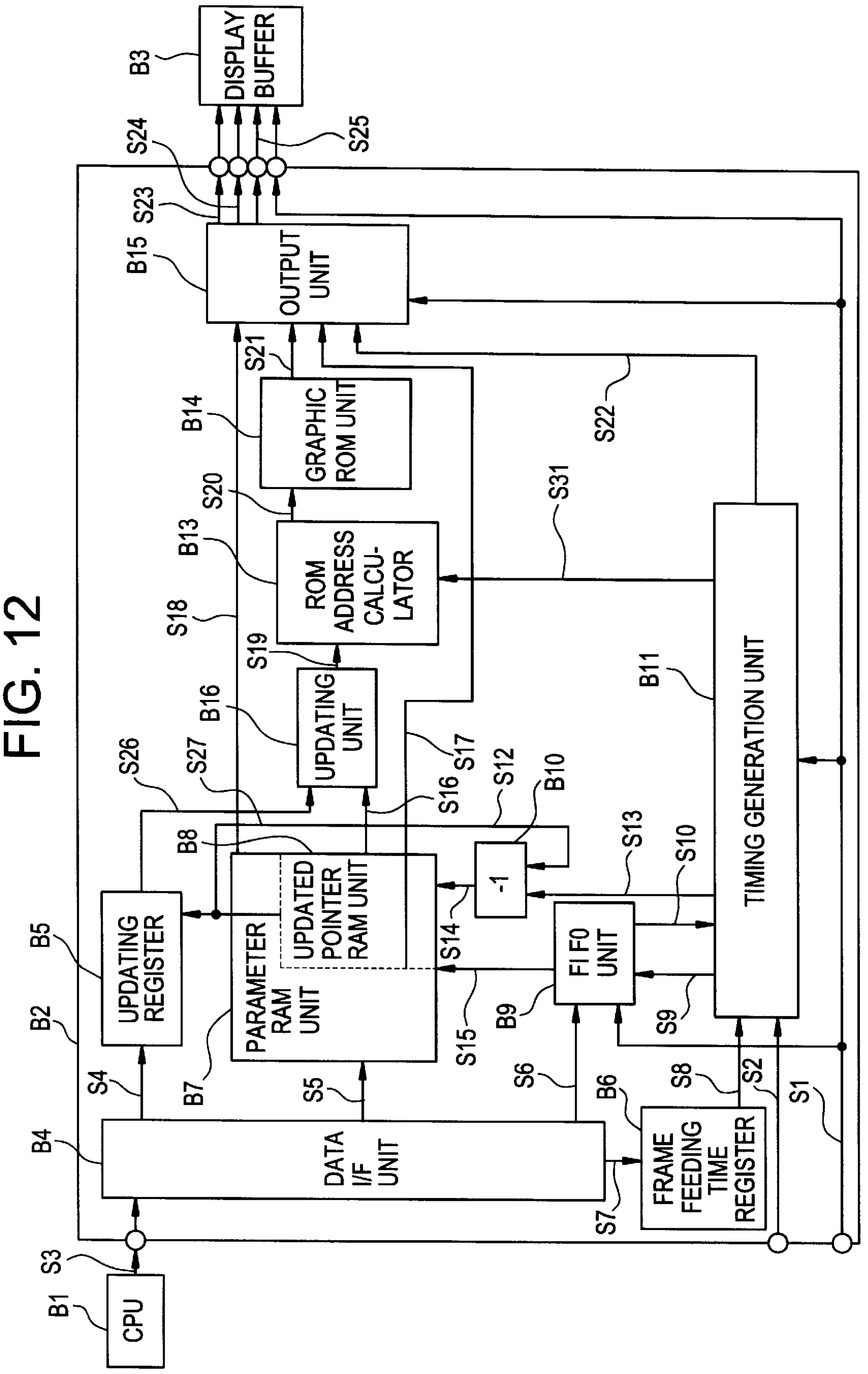
FIG. 12 shows a circuit configuration of the second embodiment.

The second embodiment of the present invention will now be described with reference to a circuit configuration of FIG. 12, the flowchart of FIG. 7, and the data configuration of the parameter RAM unit of FIG. 9, and a data configuration of the updating register of FIG. 13. Explanations of units included in the first embodiment are omitted.

The second embodiment differs from the first embodiment in the updating register B5 and the address updating unit B16. The other units are the same as those in the first embodiment, and follow the procedure shown in FIG. 7.

Figure 13:
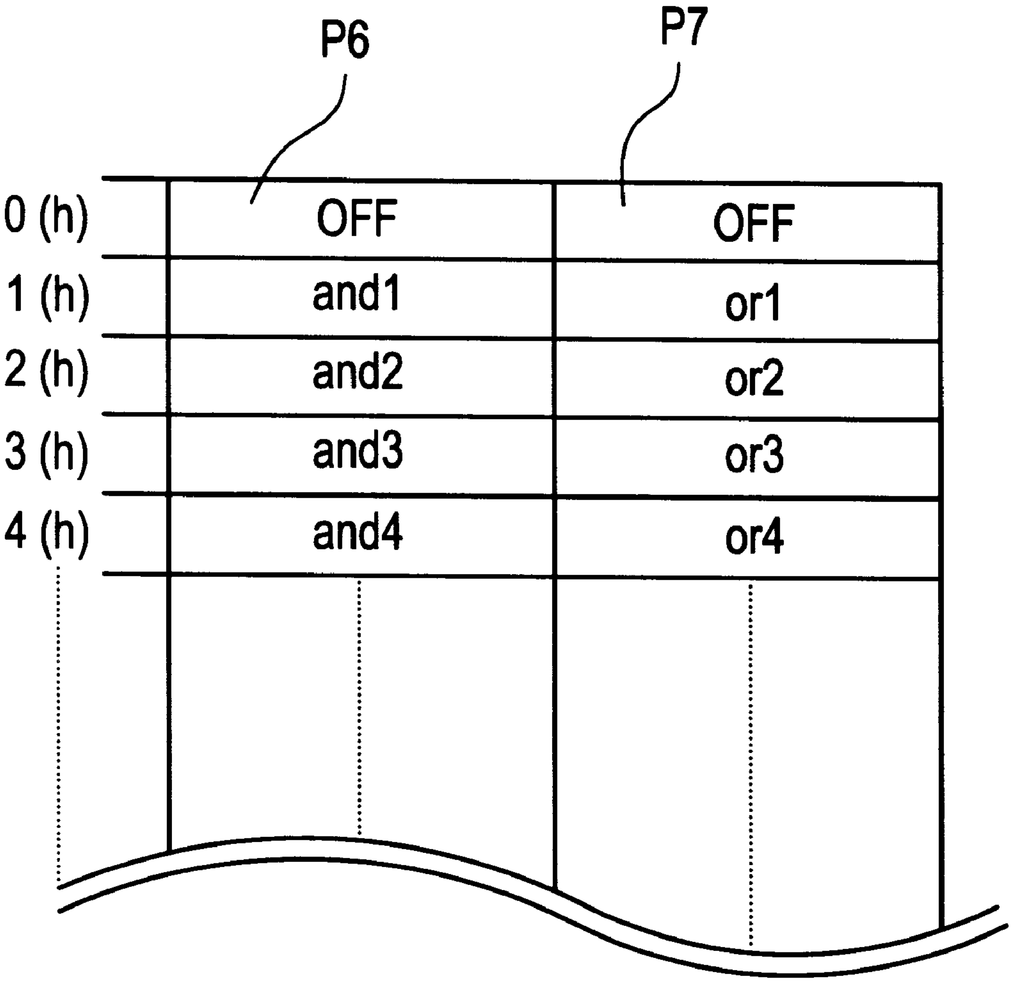
FIG. 13 shows an example of data configuration of the updating register of the second and third embodiments.

The updating register B5 of the second embodiment is, as shown in FIG. 13, stored with both the logical ANDed and ORed values of a graphic ROM original address corresponding to a primitive graphic form, and a graphic ROM original address corresponding to a dynamic graphic form. As will be described later, with these ANDed and ORed values preset to respective predetermined values, the updating unit B16 makes an AND operation and OR operation between the ANDed value and the graphic ROM original address P1, and also between the ORed value and the original address P1. A specific part of the graphic ROM original address P1 is thereby changed into a given value. The resultant value is output as an updated graphic ROM original address signal S19 to the ROM address calculation unit B13.

In the second embodiment, for display of a primitive graphic form, the updating register B5 outputs an updating register output signal (ANDed value) S26 of a high level (e.g., FFFF(h)), and an updating register output signal (ORed value) S27 of a low level (e.g., 0000(*h*)), to the updating unit B16. For display of a dynamic graphic form, the updating register B5 outputs the ANDed value S26 and the ORed value S27 to the updating unit B16. Both S26 and S27 correspond to the updating point signal S12.

Figure 14:
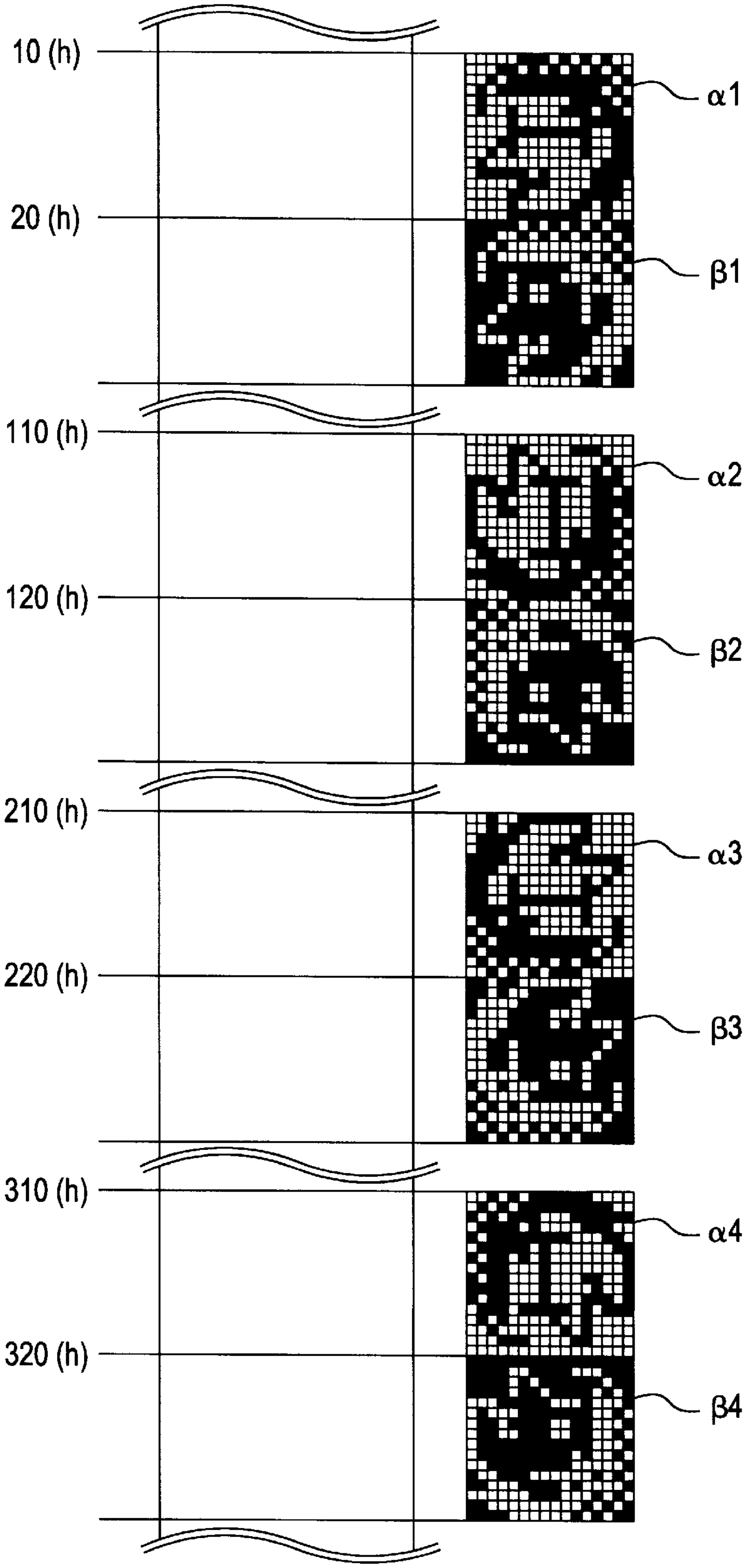
FIG. 14 shows an example of data configuration of the graphic ROM unit of the second embodiment.
Figure 15:
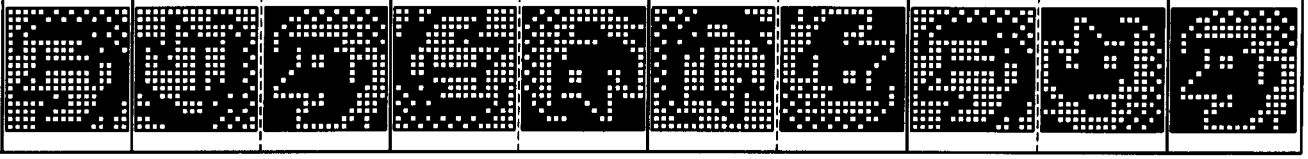
FIG. 15 shows an example of a parametric set of the second embodiment.

In the following description, for display of the frames shown in FIG. 4, the operation of setting a value in the updated pointer RAM unit B8 will be described with reference to the data configuration of the graphic ROM unit B14 shown in FIG. 14 and the parametric set example in FIG. 15.

The explanations of the operations of setting a value in the parameter RAM unit B7 and setting a graphic form number in the FIFO unit B9 will be omitted because they are the same as in the first embodiment. We assume that a graphic form number corresponds to an address in the parameter RAM unit B7. In addition, the dynamic images will be displayed in the following order: SC1, SC2, SC3, SC4, SC5, SC6, SC7, and SC1. There are two groups: A first group whose graphic form is represented by a graphic form number a(h) ; and a second group whose graphic form is represented by a graphic form number b(h) . In FIG. 4, graphic forms α1 and β1 are defined as primitive graphic forms, while graphic forms α2 to α4 and β2 to β4 are defined as dynamic images.

Note that before a frame is displayed, the updating register B5 is stored with an ANDed value P6 and an ORed value P7. Specifically, an ANDed data FF(h) and an ORed data 300(*h*) are both stored on the address 1(*h*). The ANDed data FF(h) and an ORed data 200(*h*) are both stored on the address 2(*h*). The ANDed data FF(h) and an ORed data 100(*h*) are stored on the address 3(*h*).

FRAME SC1:

For frame SC1, no graphic form is displayed. Therefore, the CPU B1 does not store a graphic form number in the FIFO unit B9. In the above manner, frame SC1 is displayed.

FRAME SC2:

For frame SC2, the CPU B1 stores graphic form number a(h) to the FIFO unit B9. Also, the CPU B1 stores the graphic ROM original address P1 (=10(*h*) ), a Y-coordinate original value P2 (=y1), and a X-coordinate original value P3 (=x1) to the address a(h) in the parameter RAM unit B7. Moreover, the CPU B1 stores the value P4 (=0(*h*)) to the address a(h) in the updated pointer RAM unit B8.

For the first group, the graphic ROM original address P1 (=10(*h*)) is logically ANDed with a high level signal (FF(h)), and then logically ORed with a low level signal (0(*h*)). Consequently, the graphic ROM address S19 becomes 10(*h*), and the graphic form α1 will be displayed. In the above manner, frame SC2 is displayed.

FRAME SC3:

For frame SC3, the CPU B1 stores graphic form numbers a(h) and b(h) to the FIFO unit B9. Also, the CPU B1 stores the graphic ROM original address P1 (=20(*h*)), a Y-coordinate original value P2 (=y2), and a X-coordinate original value P3 (=x2) to the address b(h) in the parameter RAM unit B7. Moreover, the CPU B1 stores the value P4 (=3(*h*)) to the address a(h) in the updated pointer RAM unit B8. In addition, the CPU B1 stores the value P4 (=0(*h*)) to the address b(h) in the updated pointer RAM unit B8.

For the first group, the graphic ROM original address P1 (=10(*h*)) is logically ANDed with the ANDed value P6 (FF(h)), and then logically ORed with the ORed value P7 (100(*h*)). Consequently, the graphic ROM address S19 becomes 110(*h*), and the graphic form α2 will be displayed. For the second group, the graphic ROM original address P1 (=20(*h*)) is logically ANDed with the high level signal (FF(h)), and then logically ORed with the low level signal (0(*h*)) Consequently, the graphic ROM address S19 becomes 20(*h*), and the graphic form β1 will be displayed. In the above manner, frame SC3 is displayed.

FRAME SC4:

For frame SC4, the CPU B1 stores graphic form numbers a(h) and b(h) to the FIFO unit B9. Also, the CPU B1 stores the value P4 (=3(*h*)) to the address b(h) in the updated pointer RAM unit B8. The value P4 on the address a(h) (=2(*h*)) is already stored in the updated pointer RAM unit B8 by the ponter updating unit B10.

For the first group, the graphic ROM original address P1 (=10(*h*)) is logically ANDed with the ANDed value P6 (FF(h)), and then logically ORed with the ORed value P7 (200(*h*)). Consequently, the graphic ROM address S19 becomes 210(*h*), and the graphic form α3 will be displayed. For the second group, the graphic ROM original address P1 (=20(*h*)) is logically ANDed with the ANDed value P6 (FF(h)), and then logically ORed with the ORed value P7 (=100(*h*)). Consequently, the graphic ROM address S19 becomes 120(*h*), and the graphic form β2 is displayed. In the above manner, frame SC4 is displayed.

FRAME SC5:

For frame SC5, the CPU B1 stores graphic form numbers a(h) and b(h) to the FIFO unit B9. The value P4 on the address a(h) (=1(*h*)) and the value P4 on the address b(h) (=2(*h*)) are already stored in the updated pointer RAM unit B8 by the ponter updating unit B10.

For the first group, the graphic ROM original address P1 (=10(*h*)) is logically ANDed with the ANDed value P6 (FF(h)), and then logically ORed with the ORed value P7 (300(*h*)). Consequently, the graphic ROM address S19 becomes 310(*h*), and the graphic form α4 will be displayed. For the second group, the graphic ROM original address P1 (=20(*h*)) is logically ANDed with the ANDed value P6 (FF(h)), and then logically ORed with the ORed value P7 (=200(*h*)). Consequently, the graphic ROM address S19 becomes 220(*h*), and the graphic form β3 is displayed. In the above manner, frame SC5 is displayed.

FRAME SC6:

For frame SC6, the CPU B1 stores graphic form numbers a(h) and b(h) to the FIFO unit B9. The value P4 on the address a(h) (=0(*h*)) and the value P4 on the address b(h) (=1(*h*)) are already stored in the updated pointer RAM unit B8 by the ponter updating unit B10.

For the first group, since the graphic ROM original address P1 stays 10(*h*), the graphic form α1 is displayed. For the second group, the graphic ROM original address P1 (=20(*h*)) is logically ANDed with the ANDed value P6 (FF(h)), and then logically ORed with the ORed value P7 (=300(*h*)) . Consequently, the graphic ROM address S19 becomes 320(*h*), and the graphic form β4 is displayed. In the above manner, frame SC6 is displayed.

FRAME SC7:

For frame SC7, the CPU B1 stores a graphic form number b(h) to the FIFO unit B9. The value P4 (=0(*h*)) is already stored on the address b(h) in the updated pointer RAM unit B8.

For the second group, since the graphic ROM original address P1 stays 20(*h*), the graphic form β1 is displayed. In the above manner, frame SC7 is displayed.

Frame SC1 will then be displayed again.

In the above manner, the frames shown in FIG. 4 are successfully displayed.

THIRD EMBODIMENT

In the second embodiment, graphic forms for dynamic images are designated by the ANDed value P6 and ORed value P7 stored in the updating register B5. The advantage of this approach will be made more apparent in the third embodiment. In the third embodiment, a WAIT control approach is different from that of the second embodiment. It should be noted, however, that the advantages of the address designation approach using the ANDed value P6 and ORed value P7 are nonetheless retained in the third embodiment.

The third embodiment will be detailed with reference to the flowchart in FIG. 16, the circuit configuration in FIG. 17 and FIG. 18, the data configuration of a parameter RAM unit in FIG. 19, and the data configuration of an updating register in FIG. 13. The explanations of elements already explained in the first and second embodiments are omitted.

In the third embodiment, additional parameters will be stored in the updated pointer RAM unit B8 so that the frame feeding time register B6 can be stored with a value for each graphic form. This configuration is different from that of the first and second embodiments, but the updating register B5 and the updating unit B16 in the third embodiment are both equivalent to those of the second embodiment.

To sum up, in the first and second embodiments, the number of frames for displaying each of the dynamic graphic forms is the same. However, in the third embodiment, the number of frames will be different for each dynamic graphic form.

Figure 19:
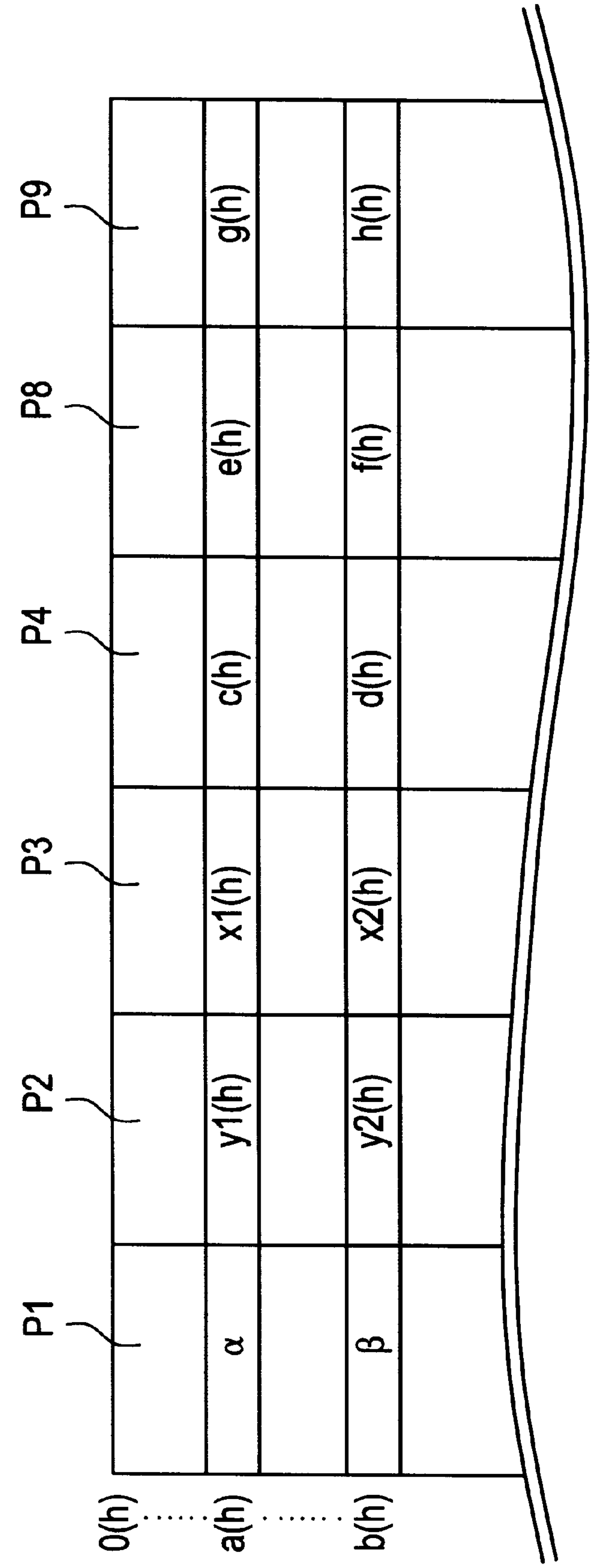
FIG. 19 shows the data configuration of the parameter RAM unit of the third embodiment.

As shown in FIG. 19, the updated pointer RAM unit B8 is stored with the updated value P4, as well as a WAIT set value P8 and a WAITTMP value P9. The WAIT set value P8 is stored with the number of frames in the image to be displayed. The initial value of the WAITTMP value P9 is the same as that of the WAIT set value P8. When the WAITTMP value P9 becomes zero, the WAIT set value P8 is loaded (how this is done will be described in detail later)

Figure 16:
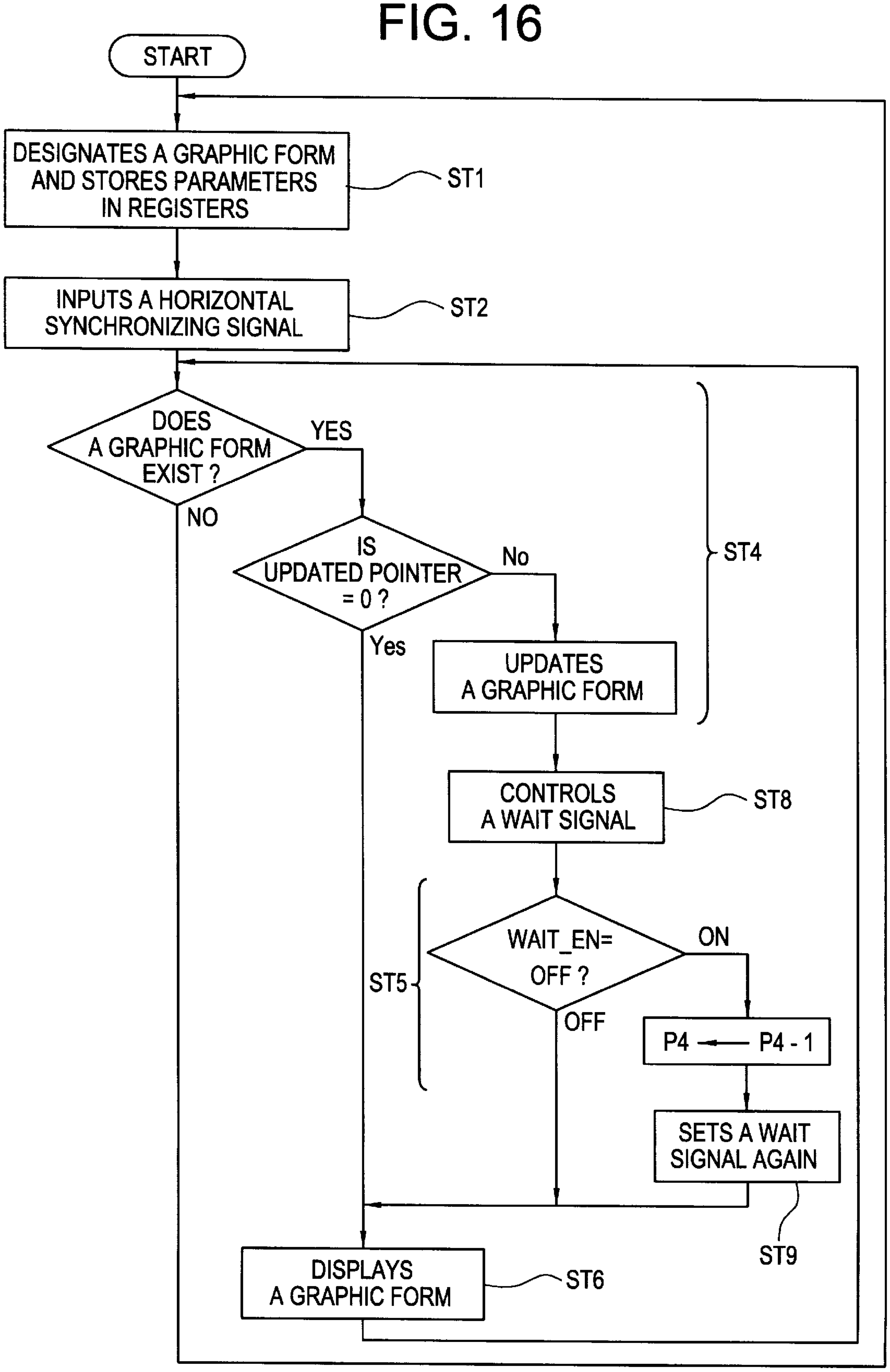
FIG. 16 is a flowchart showing the procedure of the third embodiment.
Figure 17:
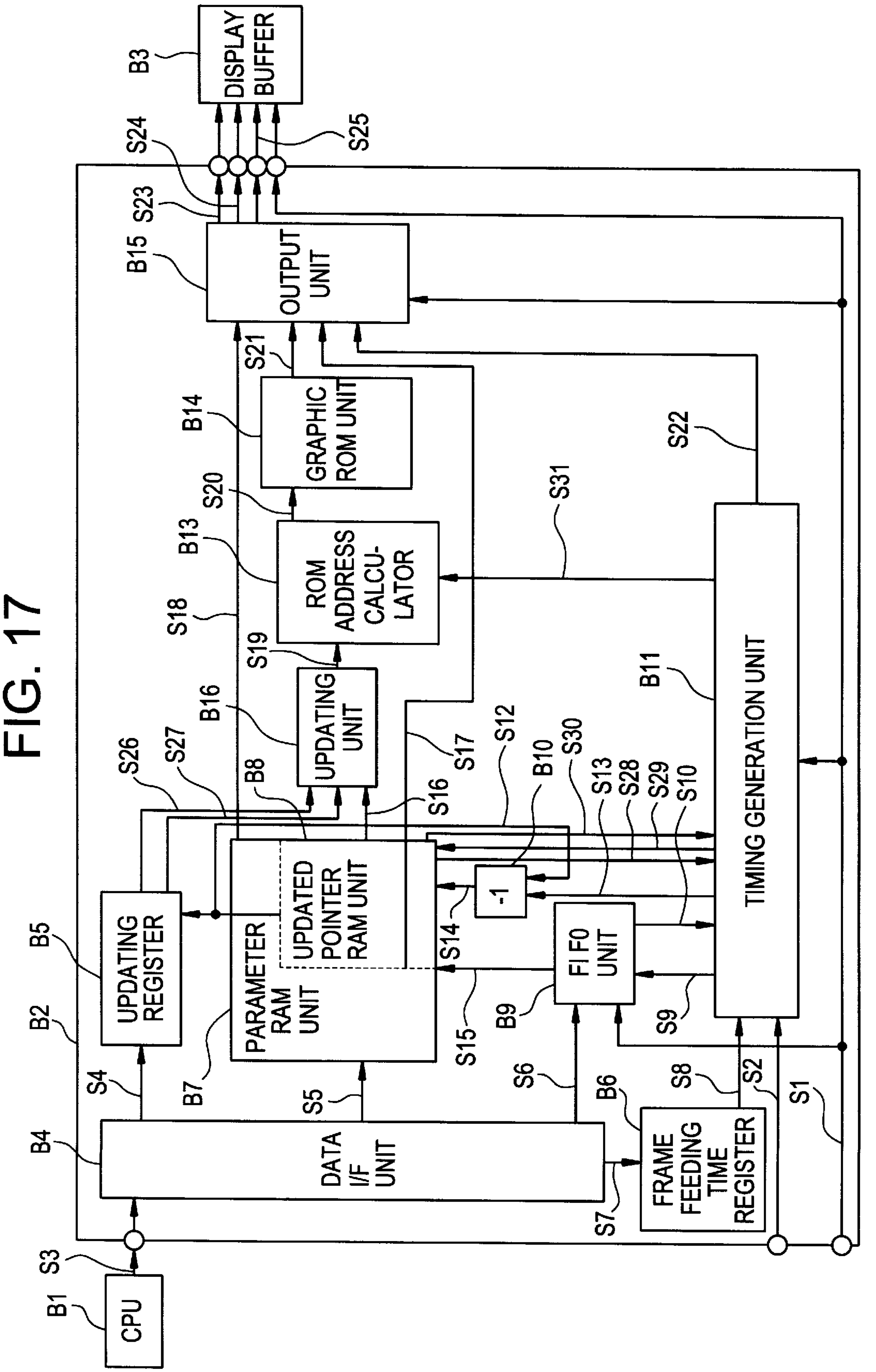
FIG. 17 shows a circuit configuration of the third embodiment.

In terms of the previously described points, the third embodiment differs from the first and second embodiments, complying with the procedure shown in the flowchart of FIG. 16. Specifically, compared to the flowchart of FIG. 7, when a graphic form is updated in accordance with the updated value P4 (step ST4), the WAITTMP value P9 is decreased by one in sync with receipt of the horizontal synchronizing signal S2 (step ST8) . While the WAITTMP value P9 is not zero, the WAIT_EN signal S13 is at the disable level (to see FIG. 18). Because of this, the same graphic form is displayed continually (step ST6) . When the WAITTMP value P9 becomes zero, the WAIT_EN signal S13 is at the enable level (to see FIG. 18). Because of this, the updated value P4 is decreased by one in order to update a graphic form to be displayed (step ST5) . The WAIT set value P8 is then set to the WAITTMP value P9 again (step ST9).

Figure 18:
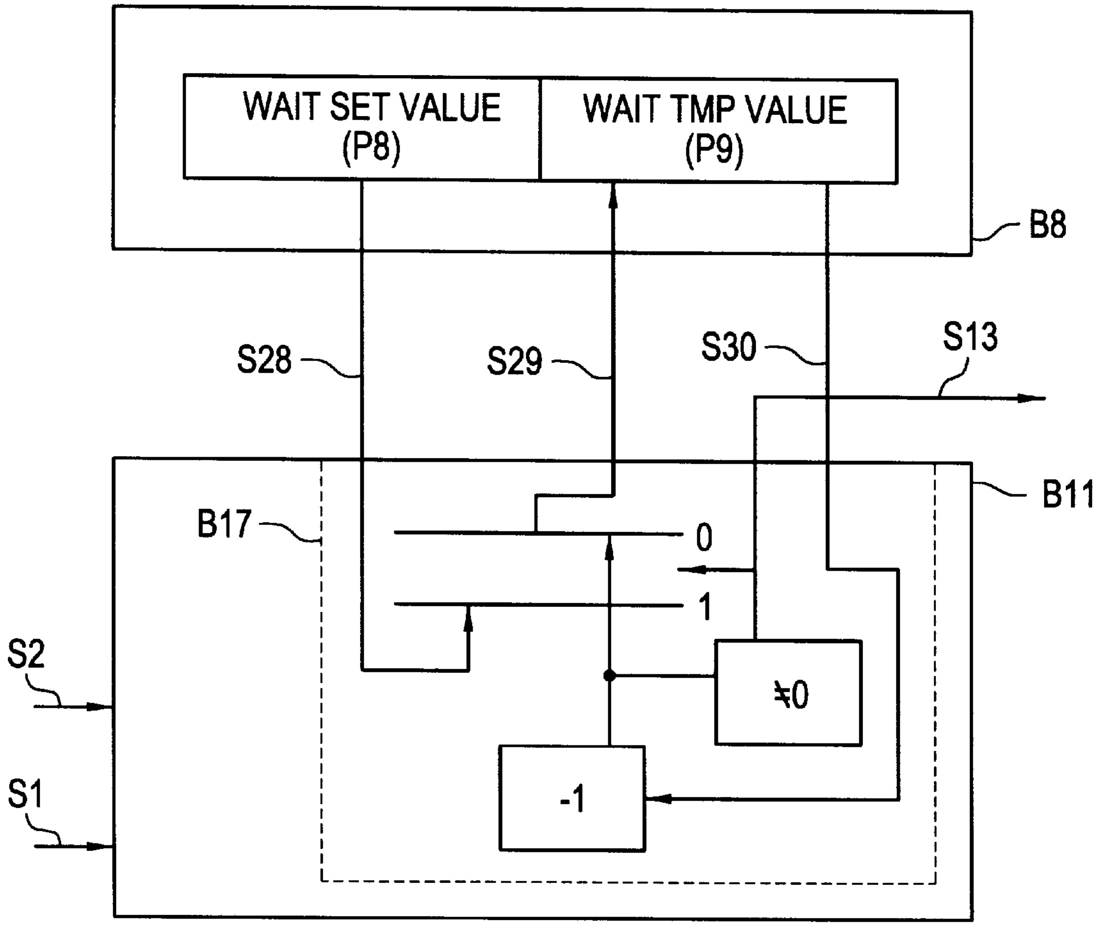
FIG. 18 shows the configuration of a WAIT control unit of the third embodiment.

With reference to FIG. 18, the WAIT control of the third embodiment will be described hereafter. FIG. 18 shows the part of the timing generation unit B11 of FIG. 17. As shown in FIG. 18, a WAIT control unit B17 is embedded in the timing generation unit B11. The WAIT control unit B17 receives a WAIT input signal S30 representing the WAITTMP value P9 in the updated pointer RAM unit B8, decreasing it by one in sync with receipt of the horizontal synchronizing signal S2. If the resulting decreased value is not equal to zero, the WAIT control unit B17 sets the WAIT_EN signal S13 to the disable level (logical 0 level), selecting the decreased value by a selector and outputting it as the WAIT output signal S29 to the updated pointer RAM unit B8. The WAITTMP value P9 is accordingly set again. Otherwise, if the resultant decreased value is equal to zero, the WAIT_EN signal S13 is set to the enable level (logical 1 level). In addition, the WAIT set value P8 (received as the WAIT input signal S28) is selected by the selector, being output as the WAIT output signal S29. The WAITTMP value P9 is then reset.

Figure 21:
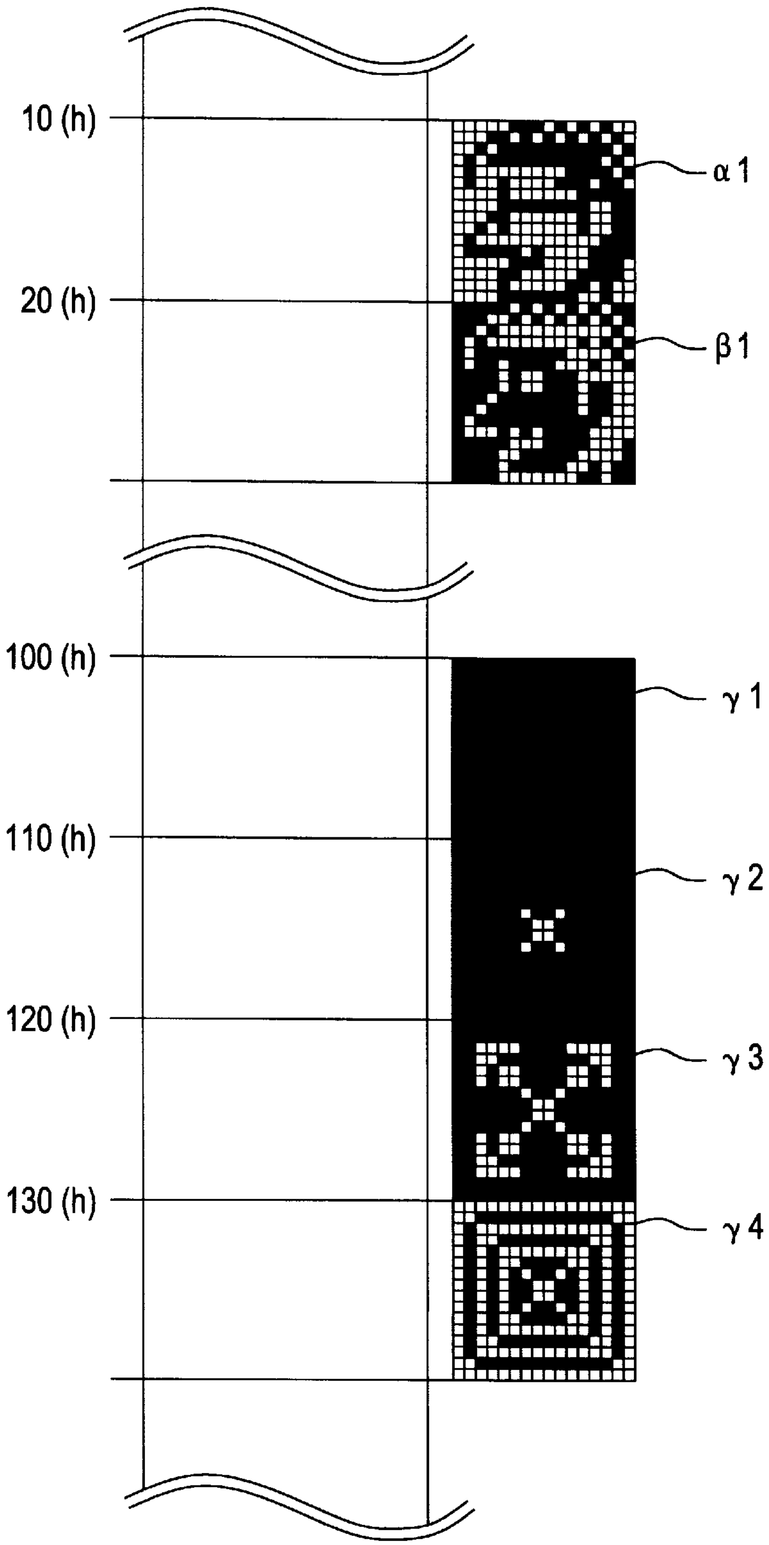
FIG. 21 shows a data configuration of the graphic ROM unit of the third embodiment.
Figure 22:
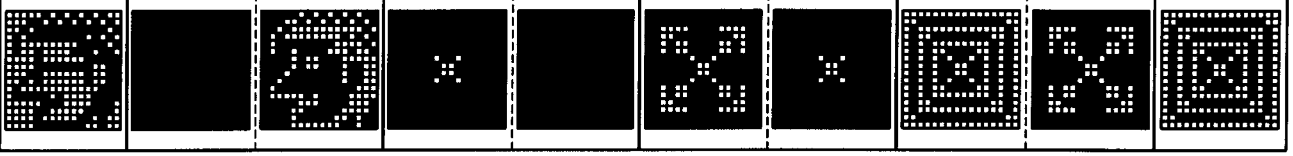
FIG. 22 shows an example of a parametric set of the third embodiment.

Hereafter, for display of the frames shown in FIG. 20, the operations of storing: values in the parameter RAM unit B7, values in the updated pointer RAM unit B8, and graphic form numbers in the FIFO unit B9 will be described with reference to the data configuration in the graphic ROM unit B14 shown in FIG. 21 and the parametric set example shown in FIG. 22.

We assume in the following description that the graphic form number corresponds to an address in the parameter RAM unit B7. Dynamic images are displayed in the following order: SC1, SC2, SC8, SC9, SC10, SC11, SC12, and SC1. Moreover, we assume that there are two groups of graphic forms: A first group whose graphic form is referred by a graphic form number a(h); and a second group whose graphic form is referred by a graphic form number b(h). In the graphic forms shown in FIG. 21, we assume that α1 and β1 are of primitive graphic forms, and γ1 to γ4 are for dynamic images.

Note that before display, the updating register B5 is stored with the ANDed value P6 and the ORed value P7. Specifically, an ANDed data 0(*h*) and an ORed data 130(*h*) are both stored on the address 1(*h*); an ANDed data 0(*h*) and an ORed data 120(*h*), on the address 2(*h*); an ANDed data 0(*h*) and an ORed data 110(*h*), on the address 3(*h*); and an ANDed data 0(*h*) and an ORed data 100(*h*), on the address 4(*h*).

FRAME SC1:

For frame SC1, no graphic form is displayed. Therefore, the CPU B1 does not store a graphic form number in the FIFO unit B9. In the above manner, frame SC1 is displayed.

FRAME SC2:

For frame SC2, the graphic form α1 mapped on the address 10(*h*) to the graphic ROM unit B14 will be displayed on coordinates (x1, y1). However, a graphic form of the second group is not displayed.

The CPU B1 stores the graphic form number a(h) to the FIFO unit B9. Also, the CPU B1 stores a graphic ROM original address P1 (=10(*h*)), a Y-coordinate original value P2 (=y1), and a X-coordinate original value P3 (=x1) to the address a(h) in the parameter RAM unit B7. Moreover, the CPU B1 stores the value P4 (=0(*h*)) to the address a(h) in the updated pointer RAM unit B8. Since the value P4 on the address a(h) is equal to 0(*h*), it is determined that display of the dynamic images is not activated. Thus, for the first group, the graphic ROM original address P1 (=10(*h*)) is logically ANDed with a high level signal, and then logically ORed with a low level signal. Consequently, the graphic ROM address S19 becomes 10(*h*), and the graphic form α1 is displayed. In the above manner, frame SC2 is displayed.

FRAME SC8:

For frame SC8, graphic form Y1 mapped on the address 100(*h*) in the graphic form ROM B14 is displayed as a graphic form of the first group on coordinates (x1, y1). In addition, the graphic form β1 mapped on the address 20(*h*) in the graphic form ROM B14, is displayed as a graphic form of the second group at coordinates (x2, y2).

The CPU B1 stores the graphic form numbers a(h) and b(h) to the FIFO unit B9. The address values P1, P2, and P3 on the address a(h) in the parameter RAM unit B7 are all unnecessary to be set again. The CPU B1 stores the graphic ROM original address P1 (=20(*h*)), a Y-coordinate original value P2 (=y2), and a X-coordinate original value P3 (=x2) to the address b(h) in the parameter RAM unit B7. Moreover, the CPU B1 stores the value P4 (=4(*h*)) to the address a(h) in the updated pointer RAM unit B8. In addition, the CPU B1 stores the value P4 (=0(*h*)) to the address b(h) in the updated pointer RAM unit B8. For the first group, since the value P4 on the address a(h) is equal to 4(*h*), the graphic ROM original address P1 (=10(*h*)) is ANDed with the ANDed value P6 (=0(*h*)), and then ORed with ORed value P7 (=100(*h*)). Thus, the ROM address signal S19 becomes 100(*h*), and the graphic form γ1 is displayed. Thereafter, the value P4 stored on the address a(h) in the updated pointer RAM unit B8 is automatically reset to 3(*h*). For the second group, since the value P4 on the address b(h) is equal to 0(*h*), the graphic ROM address signal S19 becomes 20(*h*), and the graphic form α1 will be displayed. In the above manner, frame SC8 is displayed.

FRAME SC9:

For frame SC9, graphic form γ2 mapped on the address 110(*h*) in the graphic form ROM B14 is displayed as a graphic form of the first group at the coordinates (x1, y1) . In addition, the graphic form γ1 mapped on the address 100(*h*) in the graphic form ROM B14 is displayed as a graphic form of the second group at the coordinates (x2, y2).

The CPU B1 stores the graphic form numbers a(h) and b(h) to the FIFO unit B9. The address values P1, P2, and P3 on the addresses a(h) and b(h) in the parameter RAM unit B7 are all unnecessary to be set again. The CPU B1 stores the value P4 (=4(*h*)) to the address b(h) in the updated pointer RAM unit B8. At this time, the value P4 (=3(*h*)) on the address a(h) is already stored in the updated pointer RAM unit B8 by the ponter updating unit B10. For the first group, since the value P4 on the address a(h) is equal to 3(*h*), the graphic ROM original address P1(=10(*h*)) is ANDed with the ANDed value P6 (=0(*h*)), and then ORed with ORed value P7 (=110(*h*)). Thus, the ROM address signal S19 becomes 110(*h*), and the graphic form γ2 is displayed. Thereafter, the value P4 stored on the address a(h) in the updated pointer RAM unit B8 is automatically reset to 2(*h*). For the second group, since the value P4 is equal to 4(*h*), the graphic ROM original address P1 (=20(*h*)) is ANDed with the ANDed value P6 (=0(*h*)), and then ORed with ORed value P7 (=100(*h*)). Thus, the ROM address signal S19 becomes 100(*h*), and the graphic form γ1 is displayed. Thereafter, the value P4 stored on the address b(h) in the updated pointer RAM unit B8 is automatically reset to 3(*h*) . In the above manner, the image frame SC9 is displayed.

FRAME SC10:

For frame SC10, graphic form γ3 mapped on the address 120(*h*) in the graphic form ROM B14 is displayed as a graphic form of the first group at the coordinates (x1, y1) . The graphic form γ2 mapped on the address 110(*h*) in the graphic form ROM B14 is displayed as a graphic form of the second group at coordinates (x2, y2).

The CPU B1 stores the graphic form numbers a(h) and b(h) to the FIFO unit B9. The address values P1, P2, and P3 on the address a(h) and b(h) in the parameter RAM unit B7 are all unnecessary to be set again. The value P4 on the address a(h) (=2(*h*)) and the value P4 on the address b(h) (=3(*h*)) are already stored in the updated pointer RAM unit B8 by the ponter updating unit B10. For the first group, since the value P4 is equal to 2(*h*), the graphic ROM original address P1 (=10(*h*)) is ANDed with the ANDed value P6 (=0(*h*)), and then ORed with ORed value P7 (=120(*h*)). Thus, the ROM address signal S19 results in being 120(*h*), and the graphic form γ3 is displayed. Thereafter, the value P4 stored on the address a(h) in the updated pointer RAM unit B8 is automatically set to 1(*h*) again. For the second group, since the value P4 is equal to 3(*h*), the graphic ROM original address P1 (=20(*h*)) is ANDed with the ANDed value P6 (=0(*h*)), and then ORed with ORed value P7 (=110(*h*)). In this way the ROM address signal S19 becomes 110(*h*) and the graphic form y2 is displayed. Thereafter, the value P4 stored on the address b(h) in the updated pointer RAM unit B8 is automatically reset to 2(*h*) In the above manner, frame SC10 is displayed.

FRAME SC11:

For frame SC11, graphic form γ4 mapped on the address 130(*h*) in the graphic form ROM B14 is displayed as a graphic form of the first group at coordinates (x1, y1) . The graphic form γ3 mapped on the address 120(*h*) in the graphic form ROM B14 is displayed as a graphic form of the second group, at coordinates (x2, y2).

The CPU B1 stores the graphic form numbers a(h) and b(h) to the FIFO unit B9. The address values P1, P2, and P3 on the address a(h) and b(h) in the parameter RAM unit B7 are all unnecessary to be set again. The value P4 on the address a(h) and b(h) are also unnecessary to be set again. The value P4 on the address a(h) (=1(*h*)) and the value P4 on the address b(h) (=2(*h*)) are already stored in the updated pointer RAM unit B8 by the ponter updating unit B10. For the first group, since the value P4 is equal to 1(*h*), the graphic ROM original address P1 (=10(*h*)) is ANDed with the ANDed value P6 (=0(*h*)), and then ORed with ORed value P7 (=130(*h*)). Thus, the ROM address signal S19 becomes 130(*h*), and the graphic form γ4 is displayed. Thereafter, the value P4 stored on the address a(h) in the updated pointer RAM unit B8 is automatically reset to 0(*h*). For the second group, since the value P4 is equal to 2(*h*), the graphic ROM original address P1 (=20(*h*)) is ANDed with the ANDed value P6 (=0(*h*)), and ORed with ORed value P7 (=120(*h*)). Thus, the ROM address signal S19 becomes 120(*h*) and the graphic form γ3 is displayed. Thereafter, the value P4 stored on the address b(h) in the updated pointer RAM unit B8 is automatically reset to 1(*h*) . In the above manner, frame SC11 is displayed.

FRAME SC12:

For frame SC12, a graphic form of the first group is not displayed. However, a graphic form γ4 mapped on the address 130(*h*) in the graphic form ROM B14 is displayed as a graphic form of the second group at coordinates (x2, y2).

The CPU B1 stores the graphic form number b(h) to the FIFO unit B9. The address values P1, P2, and P3 on the address b(h) in the parameter RAM unit B7 are all unnecessary to be set again. The value P4 on the address b(h) is also unnecessary to be set by the CPU B1 again. The value P4 (=l(*h*)) is kept on the address b(h) in the updated pointer RAM unit B8. Since the value P4 on the address b(h) is equal to 1(*h*), the graphic ROM original address P1 (=20(*h*)) is ANDed with the ANDed value P6 (=0(*h*), and then ORed with ORed value P7 (=130(*h*)). Thus, the ROM address signal S19 becomes 130(*h*), and the graphic form γ4 is displayed. Thereafter, the value P4 stored on the address b(h) in the updated pointer RAM unit B8 is automatically set to 0(*h*) again. In the above manner, frame SC12 is displayed.

Next, frame SC1 will be displayed again.

Figure 20:
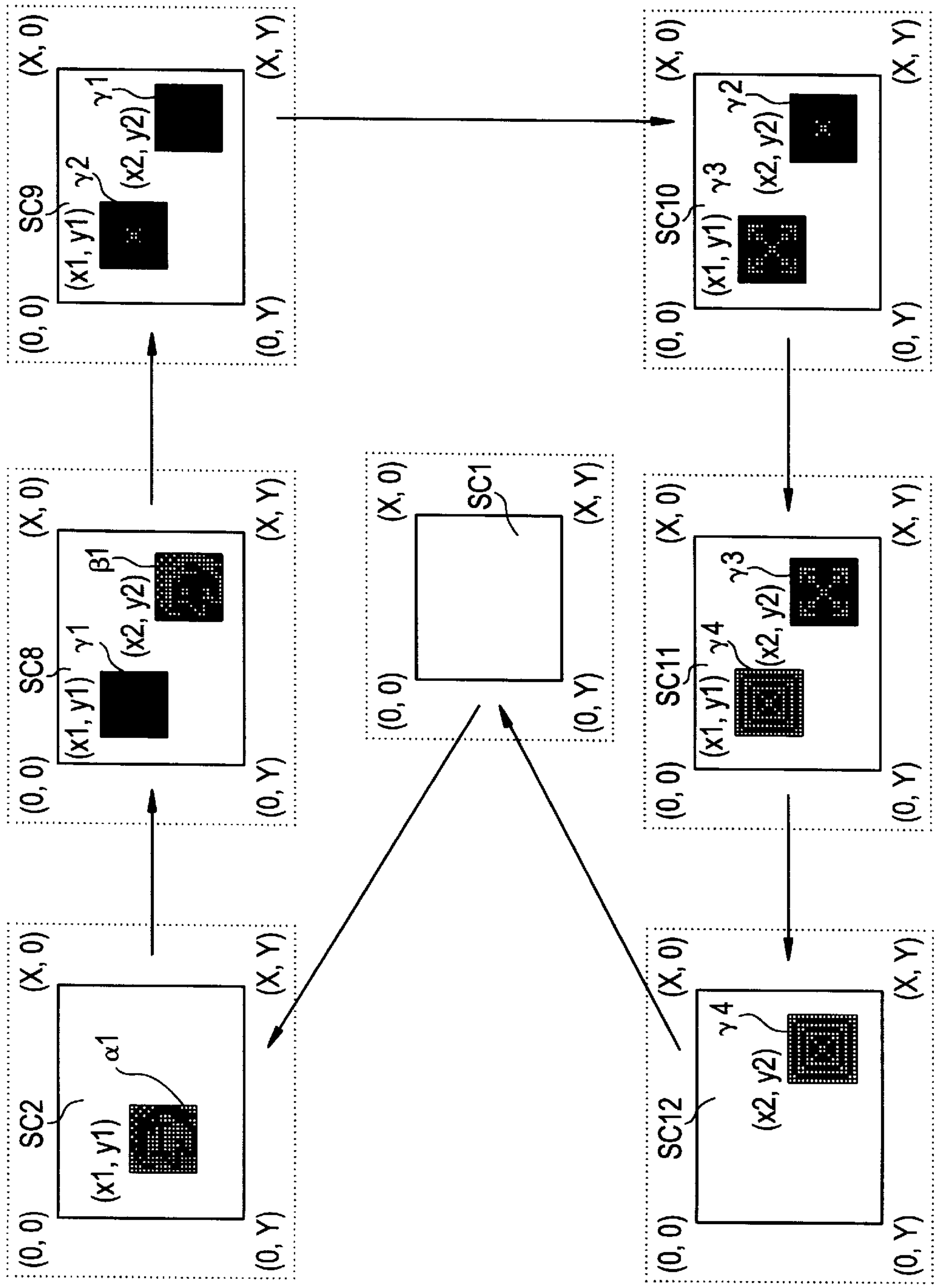
FIG. 20 shows frames to be displayed.

In the above manner, the images shown in FIG. 20 are successfully displayed.

As should be apparent from this embodiment, the number of frames of dynamic images can be changed for each graphic form.

Furthermore, according to the approach by which the ANDed value P6 and ORed value P7 in the second and third embodiments designates a graphic form, when separate primitive graphic forms share common dynamic graphic forms, a graphic ROM address for a dynamic graphic form, irrespective of the graphic ROM original address P1, is designated. In other words, the graphic ROM original address P1 is set at a certain fixed value. This allows the software program configuration for the CPU to be simpler when the embodiment of the present invention is put to practical use in, for an example, a video game machine, in which dynamic images (e.g., exploding object) are designated and displayed.

According to the present invention, the following results are expected.

Firstly, since it is made unnecessary for the CPU to set a primitive address for a graphic form every time the dynamic image to be displayed is changed, computational demand on the CPU is decreased, and the performance of the CPU is raised. In graphics processing apparatus available recently, several thousands of graphic forms are simultaneously displayed. Since this invention cuts demand significantly for each graphic form displayed, it is expected that the processing performance of the CPU will be greatly increased.

Secondly, in that case of decreased demand on the CPU related to the display of graphic forms, it is expected that the possibility of losing frames during their feeding time is also decreased by use of this graphics processing apparatus.

Thirdly, since only the graphic ROM address for a primitive graphic form and its corresponding number of frames must be set, management of dynamic images is made simpler.

In summary, regarding the graphics processing apparatus of the present invention which can display still images as well as dynamic images for a still image, a primitive graphic form and the number of dynamic graphic images to be displayed are set only once when dynamic images corresponding to a still frame are displayed. This decreases demand on the CPU, thus enhancing the CPU's actual performance.

Note that as many apparently widely different embodiments of the present invention can be made without departing from the spirit and scope thereof, it is to be understood that the invention is not limited to the specific embodiments thereof; except as defined in the appended claims. For example, a line buffer to store a line of displayed data can be exchanged for the display buffer, which will be enabled with help of the ROM address calculation unit, which receives the Y-coordinate original signal and the counted value of the horizontal synchronizing signal, and also calculating the graphic ROM address. Moreover, each of the parametric values can be changed as necessary.

What is claimed is:

1. A graphics processing apparatus comprising a graphic form storage memory storing a first graphic form on a first address and a second graphic form on a second address, a parameter memory storing a first value, an updating register storing second and third values, a pointer memory storing a fourth value which designates outputting said second value or said third value from said updating register, an address updating unit generating an address signal which designates an address value of said graphic form storage memory, a pointer updating unit receiving said forth value and outputting an updated forth value to said pointer memory to update said forth value, wherein said pointer memory outputs said forth value to said updating register and said pointer updating unit corresponding with a first control signal, said parameter memory outputs said first value to said address updating unit corresponding with said first control signal, said updating register outputs said second value to said address updating unit corresponding with said forth value, said address updating unit generates a first address signal representing said first address of said graphic form storage memory corresponding with said first value of said parameter memory and said second value of said updating register, said graphic form storage memory receives said first address signal and outputs said first graphic form, said pointer updating unit generates said updated forth value and outputs said updated forth value to said pointer memory, said pointer memory outputs said updated forth value to said updating register and said pointer updating unit corresponding with a second control signal, said parameter memory outputs said first value to said address updating unit corresponding with said second control signal, said updating register outputs said third value to said address updating unit corresponding with said updated forth value, said address updating unit generates a second address signal representing said second address of said graphic form storage memory corresponding with said first value of said parameter memory and said third value of said updating register, and said graphic form storage memory receives said second address signal and outputs said second graphic form.

2. The apparatus as claimed in claim 1, wherein said address updating unit adds said first value to said second value to generate said first address signal, and said address updating unit adds said first value to said third value to generate said second address signal.

3. The apparatus as claimed in claim 1, wherein said second value includes a first AND value and a first OR value, said third value includes a second AND value and a second OR value, said address updating unit ANDs said first value with said first AND value and ORs the results of ANDs with said first OR value to generate said first address signal, and said address updating unit ANDs said first value with said second AND value and ORs the results of ANDs with said second OR value to generate said second address signal.

4. The apparatus as claimed in claim 1, wherein said updating register stores said second value on a first store address and said third value on a second store address, said fourth value of said pointer memory represents said first store address, and said updated forth value of said pointer memory represents said second store address.

5. The apparatus as claimed in claim 4, wherein said pointer updating unit decrements said forth value to generate said updated forth value.

6. The apparatus as claimed in claim 1, wherein said first graphic form represents a primitive graphic form, said second graphic form represents a dynamic graphic form, said first value represents said first address of said graphic form storage memory.

7. The apparatus as claimed in claim 6, further comprises a central processing unit supplying said first, second, third, and fourth value, and said central processing unit not supplying said second address of said graphic form storage memory and said updated fourth value.

8. A method of displaying a dynamic image which comprises a primitive graphic form and at least one dynamic graphic form, said primitive graphic form being stored on a first address of said primitive graphic form, said at least one dynamic form being stored on a second address of said graphic form storage memory, said method comprising:

setting a parameter value which includes first and second values, said first value representing an address value which first value of said graphic form storage memory;

generating a first address signal representing said first address of said graphic form storage memory corresponding with said first value;

displaying said primitive graphic form which outputs from said graphic form storage memory corresponding with said first address signal;

generating a second address signal representing said second address of said graphic form storage memory corresponding with said first and second values; and displaying said at least one dynamic graphic form which outputs from said graphic form storage memory corresponding with said second address signal.

9. The method as claimed in claim 8, wherein said at least one dynamic graphic form includes first and second dynamic graphic forms, said first dynamic graphic form is stored on said second address of said graphic form storage memory, said second dynamic graphic form is stored on a third address of said graphic form storage memory, said method further comprising:

updating said second value to generate an updated second value;

generating a third address signal representing said third address of said graphic form storage memory corresponding with said first and updated second values; and displaying said second dynamic graphic form which outputs from said graphic form storage memory corresponding with said third address signal.

10. The method as claimed in claim 9, wherein said generating a third address signal adds said first value to said updated second value to generate said third address signal.

11. The method as claimed in claim 9, wherein said updated second value includes a first AND value and a first OR value, said generating a third address signal ANDs said first value with said first AND value and ORs the results of ANDs with said first OR value to generate said first address signal to generate said third address signal.

12. The method as claimed in claim 8, wherein said generating a second address signal adds said first value to said second value to generate said second address signal.

13. The method as claimed in claim 8, wherein said second value includes a first AND value and a first OR value, said generating a second address signal ANDs said first value with said first AND value and ORs the results of ANDs with said first OR value to generate said first address signal to generate said second address signal.

* * * * *